US012732233B2

(12) United States Patent
Sahraei et al.

(10) Patent No.: US 12,732,233 B2
(45) Date of Patent: Sep. 8, 2026

(54) BEAM ACQUISITION FOR A RECONFIGURABLE INTELLIGENT SURFACE

(71) Applicant: QUALCOMM INCORPORATED, San Diego, CA (US)

(72) Inventors: Saeid Sahraei, San Diego, CA (US); Krishna Kiran Mukkavilli, San Diego, CA (US); Yu Zhang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 18/705,962

(22) PCT Filed: Dec. 10, 2021

(86) PCT No.: PCT/CN2021/136978

§ 371 (c)(1),
(2) Date: Apr. 29, 2024

(87) PCT Pub. No.: WO2023/102871

PCT Pub. Date: Jun. 15, 2023

(65) Prior Publication Data

US 2025/0007566 A1 Jan. 2, 2025

(51) Int. Cl.
*H04B 7/04* (2017.01)
*H04B 7/06* (2006.01)

(52) U.S. Cl.
CPC ..... *H04B 7/04013* (2023.05); *H04B 7/06966* (2023.05); *H04B 7/06968* (2023.05)

(58) Field of Classification Search
CPC ............ H04B 7/04013; H04B 7/06966; H04B 7/06968; H04B 7/06952; H04B 7/15528;
(Continued)

(56) References Cited

U.S. PATENT DOCUMENTS 9,872,296 B2 1/2018 Raghavan et al.
11,777,206 B2 * 10/2023 Zhu ...................... H04B 7/0617 375/267

(Continued)

FOREIGN PATENT DOCUMENTS

CN 107113041 A 8/2017
CN 111917448 A 11/2020

(Continued)

OTHER PUBLICATIONS

Ning B, Chen Z, Chen W, Du Y, Fang J. Channel estimation and hybrid beamforming for reconfigurable intelligent surfaces assisted THz communications. arXiv preprint arXiv: 1912.11662. Dec. 2019. (Year: 2019).*

(Continued)

*Primary Examiner* — Fayyaz Alam
(74) *Attorney, Agent, or Firm* — Holland & Hart LLP

(57) ABSTRACT

Methods, systems, and devices for wireless communications are described. In some systems, a base station may communicate with a user equipment (UE) via a reconfigurable intelligent surface (RIS) which is capable of adjusting a reflection characteristic to reflect incident signaling in different directions. The base station and the RIS may establish a beamformed connection and, in some scenarios, the base station and the RIS may experience a beam failure. In such scenarios, the base station, the UE, and the RIS may participate in a two-step beam training procedure to reduce an amount of possible beam pair hypotheses that the communicating devices test in order to re-establish communication between the base station and the UE via the RIS. The two-step beam training procedure may include a first procedure in which the RIS selects a suitable beam toward the base station and a second procedure that leverages the selected beam.

30 Claims, 17 Drawing Sheets

(58) Field of Classification Search
CPC . H04B 7/04026; H04B 17/318; H04W 24/08; H04W 24/10
See application file for complete search history.

(56) References Cited

U.S. PATENT DOCUMENTS

| | | | | |
|---|---|---|---|---|
| 12,483,305 | B2 * | 11/2025 | Rusek | H04B 7/0482 |
| 2017/0347358 | A1 * | 11/2017 | Raghavan | H04B 7/0874 |
| 2019/0116605 | A1 | 4/2019 | Luo et al. | |
| 2023/0246674 | A1 * | 8/2023 | Åström | H04B 7/145<br>375/262 |

FOREIGN PATENT DOCUMENTS

| | | | | |
|---|---|---|---|---|
| EP | 2372842 | A2 * | 10/2011 | H01Q 19/104 |
| EP | 3962006 | A1 * | 3/2022 | H04B 7/0617 |
| WO | WO-2016111803 | | 7/2016 | |
| WO | WO-2019231716 | | 12/2019 | |
| WO | WO-2021239259 | A1 | 12/2021 | |

OTHER PUBLICATIONS

International Search Report and Written Opinion—PCT/CN2021/136978—ISA/EPO—Jul. 25, 2022.
Ning B., et al., "Channel Estimation and Hybrid Beamforming for Reconfigurable Intelligent Surfaces Assisted THz Communications", arXiv: 1912.11662v1 [cs.IT], Cornell University Library, 201 Olin Library Cornell University Ithaca, NY 14853, Dec. 25, 2019, pp. 1-16, XP081566211, p. 4-p. 6, figures 3, 7, 8.
Supplementary European Search Report—EP219667931'Search Authority—Munich—Jul. 30, 2025.
Wang W., et al., "Joint Beam Training and Positioning for Intelligent Reflecting Surfaces Assisted Millimeter Wave Communications", IEEE Transactions on Wireless Communications, IEEE Service Center, Piscataway, NJ, US, vol. 20, No. 10, Apr. 21, 2021, pp. 6282-6297, XP011882555, abstract.
Wu Q., et al., "Intelligent Reflecting Surface Enhanced Wireless Network: Joint Active and Passive Beamforming Design", 2018 IEEE Global Communications Conference (GLOBECOM), IEEE, Dec. 9, 2018, 6 Pages, XP033519782, p. 1-p. 2, figure 1.
Wu Q., et al., "Intelligent Reflecting Surface-Aided Wireless Communications: A Tutorial", IEEE Transactions on Communications, IEEE Service Center, Piscataway, NJ, USA, vol. 69, No. 5, Jan. 18, 2021, pp. 3313-3351, XP011855356, p. 24, p. 32.

Figure 2:
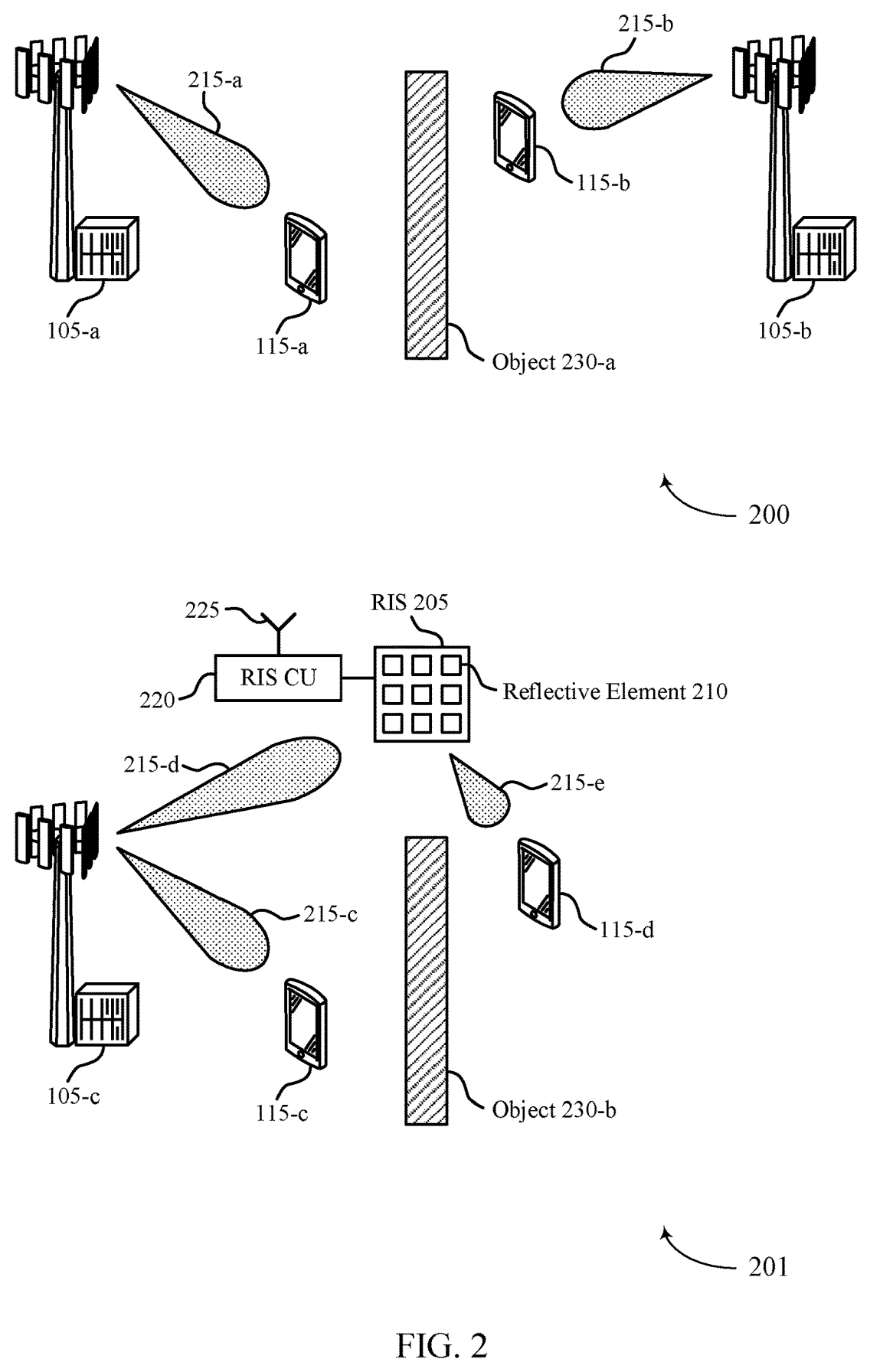

* cited by examiner 215-b
215-a
115-b
105-a
115-a
Object 230-a
105-b
200

225
RIS 205
RIS CU
220
Reflective Element 210
215-d
215-e
215-c
115-d
105-c
115-c
Object 230-b
201

Figure 17:
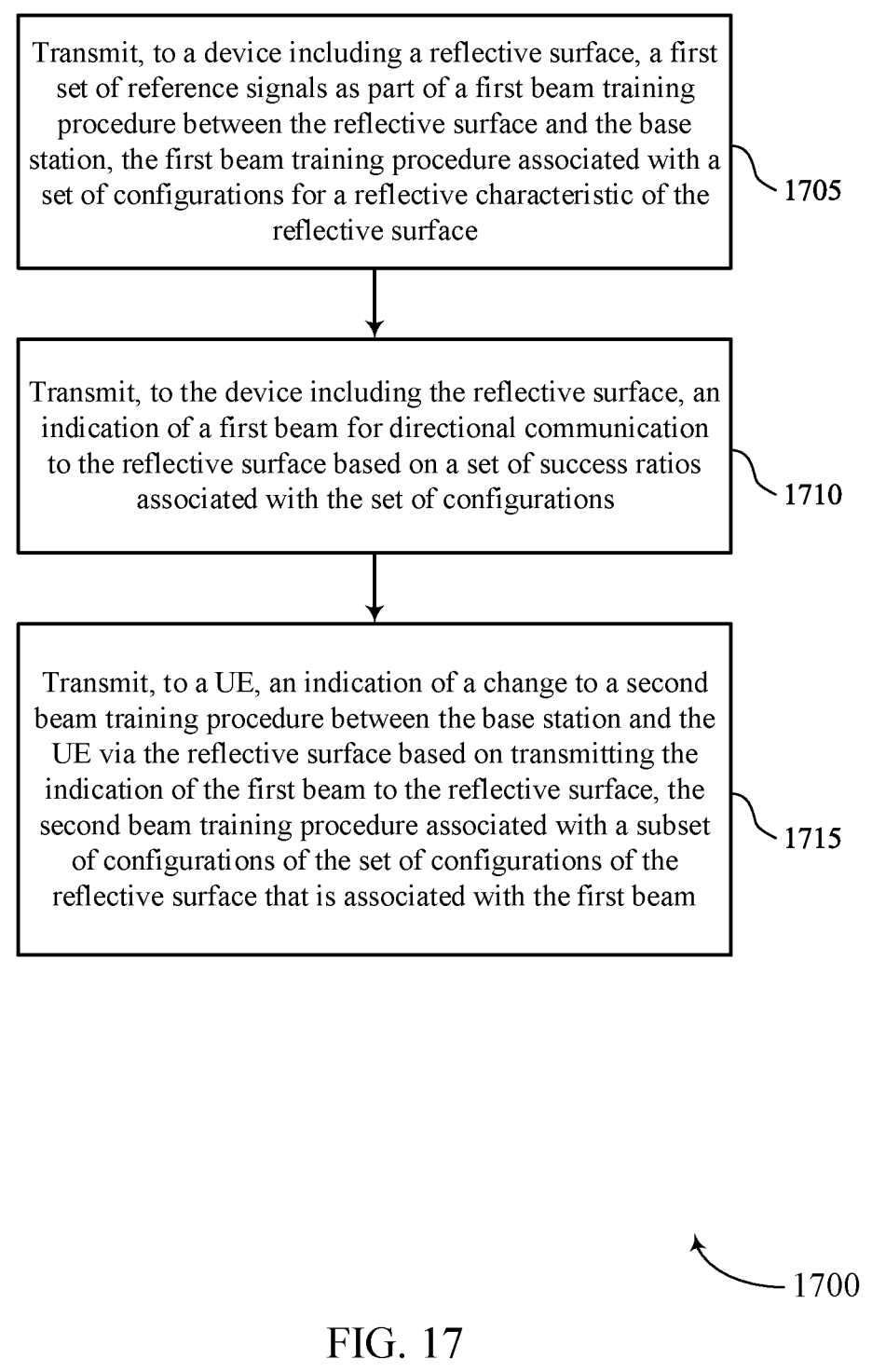

Transmit, to a device including a reflective surface, a first set of reference signals as part of a first beam training procedure between the reflective surface and the base station, the first beam training procedure associated with a set of configurations for a reflective characteristic of the reflective surface

1705

Transmit, to the device including the reflective surface, an indication of a first beam for directional communication to the reflective surface based on a set of success ratios associated with the set of configurations

1710

Transmit, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam

BEAM ACQUISITION FOR A RECONFIGURABLE INTELLIGENT SURFACE

CROSS REFERENCE

The present application is a 371 national stage filing of International PCT Application No. PCT/CN2021/136978 by Sahraei et al. entitled "BEAM ACQUISITION FOR A RECONFIGURABLE INTELLIGENT SURFACE," filed Dec. 10, 2021, which is assigned to the assignee hereof, and which is expressly incorporated by reference in its entirety herein.

FIELD OF TECHNOLOGY

The following relates to wireless communications, including beam acquisition for a reconfigurable intelligent surface (RIS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, two or more devices may communicate with each other via a reflective surface. For example, a first device may transmit signaling toward the reflective surface and a second device may receive the signaling reflected off the reflective surface.

SUMMARY

The techniques described herein relate to improved methods, systems, devices, and apparatuses that support beam acquisition for a reconfigurable intelligent surface (RIS). Generally, the techniques described herein provide for a two-step beam training procedure for selecting a configuration of an RIS in accordance with a suitable receive beam for receiving, at the RIS, communications from a base station and a suitable reflected beam for reflecting, from the RIS, the communications to a user equipment (UE). The two-step beam training procedure may include a first beam training procedure between the RIS and the base station according to which the RIS may identify or otherwise determine a suitable receive beam for receiving communications from the base station and a second beam training procedure between the base station and the UE via the RIS according to which the RIS may identify or otherwise determine a suitable reflected beam for reflecting communications to the UE. As part of the first beam training procedure, the RIS may identify or otherwise determine the suitable receive beam based on a set of success ratios associated with different configurations of the RIS and, in some implementations, such success ratios may be calculated statistically assuming a uniform distribution of UEs in a field-of-view (FoV) of the RIS. As part of the second beam training procedure, the RIS may cycle through a subset of configurations associated with the identified or determined receive beam to identify or otherwise determine a configuration of the RIS that provides a suitable reflected beam to the UE.

A method for wireless communication at a device including a reflective surface is described. The method may include configuring, as part of a first beam training procedure between the reflective surface and a base station, a reflection characteristic of the reflective surface in accordance with a set of configurations associated with the reflective surface, receiving an indication of a first beam for directional communication from the base station based on a set of success ratios associated with the set of configurations, and receiving an indication of a configuration of the reflective surface for reflecting communications between the base station and a UE based on the first beam for the directional communication from the base station and a second beam training procedure between the base station and the UE via the reflective surface.

An apparatus for wireless communication at a device including a reflective surface is described. The apparatus may include a processor, memory coupled with the processor, and instructions stored in the memory. The instructions may be executable by the processor to cause the apparatus to configure, as part of a first beam training procedure between the reflective surface and a base station, a reflection characteristic of the reflective surface in accordance with a set of configurations associated with the reflective surface, receive an indication of a first beam for directional communication from the base station based on a set of success ratios associated with the set of configurations, and receive an indication of a configuration of the reflective surface for reflecting communications between the base station and a UE based on the first beam for the directional communication from the base station and a second beam training procedure between the base station and the UE via the reflective surface.

Another apparatus for wireless communication at a device including a reflective surface is described. The apparatus may include means for configuring, as part of a first beam training procedure between the reflective surface and a base station, a reflection characteristic of the reflective surface in accordance with a set of configurations associated with the reflective surface, means for receiving an indication of a first beam for directional communication from the base station based on a set of success ratios associated with the set of configurations, and means for receiving an indication of a configuration of the reflective surface for reflecting communications between the base station and a UE based on the first beam for the directional communication from the base station and a second beam training procedure between the base station and the UE via the reflective surface.

A non-transitory computer-readable medium storing code for wireless communication at a device including a reflective surface is described. The code may include instructions executable by a processor to configure, as part of a first beam training procedure between the reflective surface and a base station, a reflection characteristic of the reflective surface in accordance with a set of configurations associated with the reflective surface, receive an indication of a first beam for directional communication from the base station based on a set of success ratios associated with the set of configurations, and receive an indication of a configuration of the reflective surface for reflecting communications between the base station and a UE based on the first beam for the directional communication from the base station and a second beam training procedure between the base station and the UE via the reflective surface.

Some examples of the method, apparatuses, and non-transitory computer-readable medium described herein may further include operations, features, means, or instructions for configuring, as part of the second beam training procedure, the reflection characteristic of the reflective surface in accordance with a subset of configurations of the set of configurations based on receiving the indication of the first beam for the directional communication from the base station, where receiving the indication of the configuration of the reflective surface for reflecting the communications between the base station and the UE may be based on configuring the reflection characteristic of the reflective surface in accordance with the subset of configurations.

In some examples of the method, apparatuses, and non-transitory computer-readable medium described herein, each configuration of the subset of configurations may be associated with a common use of the first beam as a receive beam for the directional communication from the base station and different reflected beams for directional communication to the UE.

Some examples of the method, apparatuses, and non-transitory computer-readable medium described herein may further include operations, features, means, or instructions for calculating the set of success ratios associated with the set of configurations based on configuring the reflection characteristic of the reflective surface in accordance with the set of configurations and calculating a set of values associated with a set of possible receive beams for the directional communication from the base station based on the set of success ratios, where each receive beam of the set of possible receive beams may be associated with a respective value of the set of values, and where receiving the indication of the first beam may be based on the first beam being associated with a greatest value relative to a remainder of the set of values.

In some examples of the method, apparatuses, and non-transitory computer-readable medium described herein, the set of success ratios may be calculated statistically assuming a uniform distribution of UEs in an FoV of the reflective surface.

Some examples of the method, apparatuses, and non-transitory computer-readable medium described herein may further include operations, features, means, or instructions for receiving, from the base station, an indication of a partial reduction of the set of configurations to a second subset of configurations of the set of configurations based on the set of success ratios associated with the set of configurations and configuring, as part of the first beam training procedure between the reflective surface and the base station, the reflection characteristic of the reflective surface in accordance with the second subset of configurations based on receiving the indication of the partial reduction.

Some examples of the method, apparatuses, and non-transitory computer-readable medium described herein may further include operations, features, means, or instructions for calculating a second set of success ratios associated with the second subset of configurations based on configuring the reflection characteristic of the reflective surface in accordance with the second subset of configurations and calculating a set of values associated with a set of possible receive beams for the directional communication from the base station based on the second set of success ratios, where each receive beam of the set of possible receive beams may be associated with a respective value of the set of values, and where receiving the indication of the first beam may be based on the first beam being associated with a greatest value relative to a remainder of the set of values.

Some examples of the method, apparatuses, and non-transitory computer-readable medium described herein may further include operations, features, means, or instructions for receiving, from the base station, an indication of an order associated with the second subset of configurations, where configuring the reflection characteristic of the reflective surface in accordance with the second subset of configurations may be based on the order.

Some examples of the method, apparatuses, and non-transitory computer-readable medium described herein may further include operations, features, means, or instructions for receiving, from the base station, an indication to revert to a previous configuration based on one or more signal strength measurements failing to satisfy a threshold signal strength or a network efficiency failing to satisfy a threshold network efficiency, or both.

Some examples of the method, apparatuses, and non-transitory computer-readable medium described herein may further include operations, features, means, or instructions for configuring, for reflecting the communications between the base station and the UE, the reflection characteristic of the reflective surface in accordance with the configuration.

In some examples of the method, apparatuses, and non-transitory computer-readable medium described herein, the set of configurations of the reflective surface corresponds to a first subset of beam pair hypotheses of a set of possible beam pair hypotheses, each beam pair hypothesis of the set of possible beam pair hypotheses associated with a unique pair of a receive beam for the directional communication from the base station and a reflected beam for directional communication to the UE and each configuration of the set of configurations may be associated with a respective success ratio of the set of success ratios.

A method for wireless communication at a UE is described. The method may include receiving, from a base station, an indication of a change to a second beam training procedure between the base station and the UE via a reflective surface, the second beam training procedure associated with a subset of configurations of a set of configurations of the reflective surface, updating one or more beam training parameters based on receiving the indication of the change to the second beam training procedure, and transmitting, to the base station, a measurement report indicating one or more second signal strength measurements associated with the second beam training procedure.

An apparatus for wireless communication at a UE is described. The apparatus may include a processor, memory coupled with the processor, and instructions stored in the memory. The instructions may be executable by the processor to cause the apparatus to receive, from a base station, an indication of a change to a second beam training procedure between the base station and the UE via a reflective surface, the second beam training procedure associated with a subset of configurations of a set of configurations of the reflective surface, update one or more beam training parameters based on receiving the indication of the change to the second beam training procedure, and transmit, to the base station, a measurement report indicating one or more second signal strength measurements associated with the second beam training procedure.

Another apparatus for wireless communication at a UE is described. The apparatus may include means for receiving, from a base station, an indication of a change to a second beam training procedure between the base station and the UE via a reflective surface, the second beam training procedure associated with a subset of configurations of a set of configurations of the reflective surface, means for updating one or more beam training parameters based on receiving the indication of the change to the second beam training procedure, and means for transmitting, to the base station, a measurement report indicating one or more second signal strength measurements associated with the second beam training procedure.

A non-transitory computer-readable medium storing code for wireless communication at a UE is described. The code may include instructions executable by a processor to receive, from a base station, an indication of a change to a second beam training procedure between the base station and the UE via a reflective surface, the second beam training procedure associated with a subset of configurations of a set of configurations of the reflective surface, update one or more beam training parameters based on receiving the indication of the change to the second beam training procedure, and transmit, to the base station, a measurement report indicating one or more second signal strength measurements associated with the second beam training procedure.

Some examples of the method, apparatuses, and non-transitory computer-readable medium described herein may further include operations, features, means, or instructions for performing one or more first signal strength measurements in accordance with a first beam training procedure, the first beam training procedure associated with the set of configurations of the reflective surface, where receiving the indication of the change to the second beam training procedure includes and receiving the indication of the change from the first beam training procedure to the second beam training procedure.

In some examples of the method, apparatuses, and non-transitory computer-readable medium described herein, updating the one or more beam training parameters may include operations, features, means, or instructions for discarding the one or more first signal strength measurements based on receiving the indication of the change to the second beam training procedure.

In some examples of the method, apparatuses, and non-transitory computer-readable medium described herein, updating the one or more beam training parameters may include operations, features, means, or instructions for switching from using a first set of quasi-colocation (QCL) relationships associated with a first set of reference signal beams for the first beam training procedure to using a second set of QCL relationships associated with a second set of reference signal beams for the second beam training procedure.

Some examples of the method, apparatuses, and non-transitory computer-readable medium described herein may further include operations, features, means, or instructions for receiving, from the base station, an indication of a partial reduction of the set of configurations to a second subset of configurations of the set of configurations of the reflective surface, performing one or more third signal strength measurements based on the second subset of configurations of the reflective surface, and transmitting, to the base station, a second measurement report indicating the one or more third signal strength measurements.

In some examples of the method, apparatuses, and non-transitory computer-readable medium described herein, receiving the indication of the partial reduction of the set of configurations to the second subset of configurations may include operations, features, means, or instructions for receiving an indication that a subset of reference signal beams of a first set of reference signal beams associated with the first beam training procedure may be obsolete, and where performing the one or more third signal strength measurements may be based on receiving the indication that the subset of reference signal beams may be obsolete.

A method for wireless communication at a base station is described. The method may include transmitting, to a device including a reflective surface, a first set of reference signals as part of a first beam training procedure between the reflective surface and the base station, the first beam training procedure associated with a set of configurations for a reflective characteristic of the reflective surface, transmitting, to the device including the reflective surface, an indication of a first beam for directional communication to the reflective surface based on a set of success ratios associated with the set of configurations, and transmitting, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam.

An apparatus for wireless communication at a base station is described. The apparatus may include a processor, memory coupled with the processor, and instructions stored in the memory. The instructions may be executable by the processor to cause the apparatus to transmit, to a device including a reflective surface, a first set of reference signals as part of a first beam training procedure between the reflective surface and the base station, the first beam training procedure associated with a set of configurations for a reflective characteristic of the reflective surface, transmit, to the device including the reflective surface, an indication of a first beam for directional communication to the reflective surface based on a set of success ratios associated with the set of configurations, and transmit, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam.

Another apparatus for wireless communication at a base station is described. The apparatus may include means for transmitting, to a device including a reflective surface, a first set of reference signals as part of a first beam training procedure between the reflective surface and the base station, the first beam training procedure associated with a set of configurations for a reflective characteristic of the reflective surface, means for transmitting, to the device including the reflective surface, an indication of a first beam for directional communication to the reflective surface based on a set of success ratios associated with the set of configurations, and means for transmitting, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam.

A non-transitory computer-readable medium storing code for wireless communication at a base station is described. The code may include instructions executable by a processor to transmit, to a device including a reflective surface, a first set of reference signals as part of a first beam training procedure between the reflective surface and the base station, the first beam training procedure associated with a set of configurations for a reflective characteristic of the reflective surface, transmit, to the device including the reflective surface, an indication of a first beam for directional communication to the reflective surface based on a set of success ratios associated with the set of configurations, and transmit, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam.

Some examples of the method, apparatuses, and non-transitory computer-readable medium described herein may further include operations, features, means, or instructions for calculating the set of success ratios associated with the set of configurations based on the first beam training procedure associated with the set of configurations and calculating a set of values associated with a set of possible receive beams for the reflective surface for directional communication with the base station based on the set of success ratios, where each receive beam of the set of possible receive beams may be associated with a respective value of the set of values, and where transmitting the indication of the first beam to the device including the reflective surface may be based on the first beam being associated with a greatest value relative to a remainder of the set of values.

In some examples of the method, apparatuses, and non-transitory computer-readable medium described herein, the set of success ratios may be calculated statistically assuming a uniform distribution of UEs in an FoV of the reflective surface.

Some examples of the method, apparatuses, and non-transitory computer-readable medium described herein may further include operations, features, means, or instructions for transmitting, to the device including the reflective surface and the UE, an indication of a partial reduction of the set of configurations to a second subset of configurations of the set of configurations of the reflective surface based on the set of success ratios associated with the set of configurations and transmitting, to the device including the reflective surface as part of the first beam training procedure between the reflective surface and the base station, a second set of reference signals based on the indication of the partial reduction.

Some examples of the method, apparatuses, and non-transitory computer-readable medium described herein may further include operations, features, means, or instructions for calculating a second set of success ratios associated with the second subset of configurations based on transmitting the second set of reference signals and calculating a set of values associated with a set of possible receive beams for the reflective surface for directional communication with the base station based on the set of success ratios, where each receive beam of the set of possible receive beams may be associated with a respective value of the set of values, and where transmitting the indication of the first beam may be based on the first beam being associated with a greatest value relative to a remainder of the set of values.

Some examples of the method, apparatuses, and non-transitory computer-readable medium described herein may further include operations, features, means, or instructions for transmitting, to the device including the reflective surface, an indication of an order associated with the second subset of configurations, where transmitting the second set of reference signals may be based on the order.

In some examples of the method, apparatuses, and non-transitory computer-readable medium described herein, transmitting the indication of the partial reduction of the set of configurations to the second subset of configurations to the UE may include operations, features, means, or instructions for transmitting an indication that a subset of reference signal beams of a first set of reference signal beams associated with the first beam training procedure may be obsolete, and where transmitting the second set of reference signals may be based on the indication that the subset of reference signal beams may be obsolete.

Some examples of the method, apparatuses, and non-transitory computer-readable medium described herein may further include operations, features, means, or instructions for transmitting, to the UE via the reflective surface, a second set of reference signals as part of a second beam training procedure between the base station and the UE via the reflective surface, receiving, from the UE, a measurement report indicating one or more signal strength measurements associated with the second beam training procedure, and transmitting, to the device including the reflective surface, an indication of a configuration of the reflective surface for reflecting communications between the base station and the UE based on the measurement report.

Some examples of the method, apparatuses, and non-transitory computer-readable medium described herein may further include operations, features, means, or instructions for transmitting, to the device including the reflective surface, an indication to revert to a previous configuration based on the one or more signal strength measurements failing to satisfy a threshold signal strength or a network efficiency failing to satisfy a threshold network efficiency, or both.

In some examples of the method, apparatuses, and non-transitory computer-readable medium described herein, each configuration of the subset of configurations may be associated with a common use of the first beam as a receive beam of the reflective surface and different reflected beams of the reflective surface.

BRIEF DESCRIPTION OF THE DRAWINGS

FIGS. 1 and 2 show examples of wireless communications systems that support beam acquisition for a reconfigurable intelligent surface (RIS) in accordance with aspects of the present disclosure.

FIGS. 15 through 17 show flowcharts illustrating methods that support beam acquisition for an RIS in accordance with aspects of the present disclosure.

DETAILED DESCRIPTION

Figure 1:
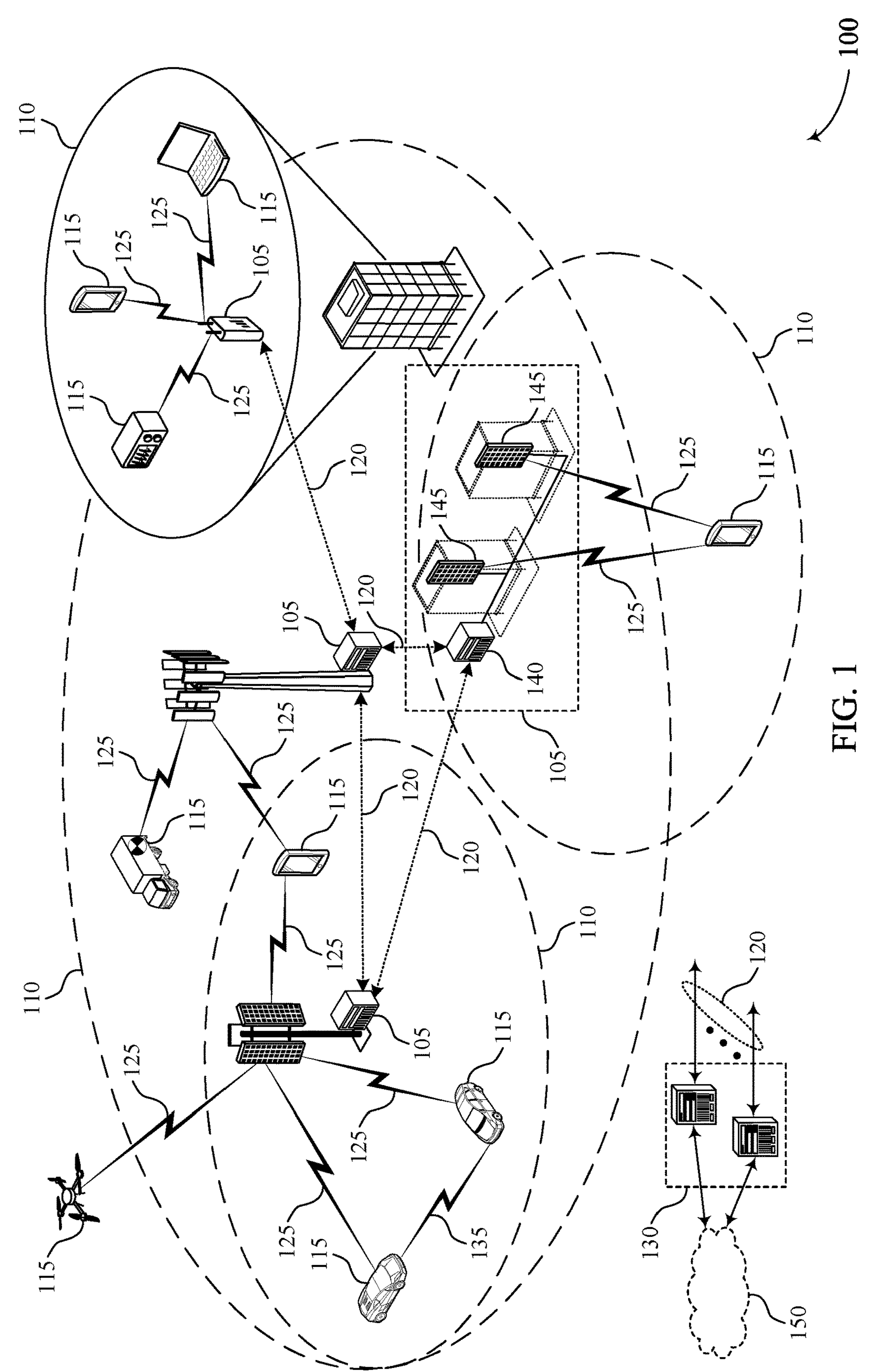

In some systems, two or more devices may communicate with each other over a radio frequency (RF) band associated with a relatively high path loss. For example, two devices may attempt to communicate with each other over an FR2, such as from about 24.25 GHz to about 52.6 GHZ, or millimeter wave (mmW), such as from about 24 GHz to about 100 GHz, RF band and, to mitigate the adverse impacts of the relatively high path loss on a coverage range of the two devices, the two devices may employ a beamforming technique according to which each of the two devices align transmission and reception in specific directions. In some deployment scenarios, direct beamforming between the two devices may still be insufficient and fail to support a reliable communication link between the two devices. In some of such deployment scenarios in which direct beamforming between the two devices is insufficient for a reliable communication link between the two devices, the two devices may use an assisting device, such as a reconfigurable intelligent surface (RIS), to support the communication link between the devices. Some RISs, which may be examples of reflective surfaces, may be associated with a relatively large quantity of configurations of the surface (for different reflection directions), where different configurations of the surface correspond to different pairs of a receive beam and a reflected beam at an RIS.

For such RISs, a beam training procedure between the two devices that considers or accounts for different configurations of an RIS may become prohibitively complex or time-consuming, as the two devices may evaluate multiple beam pairs for each configuration of the reflective surface. Further, a node capable of configuring or otherwise controlling an RIS may be unable to configure a receive beam of the RIS toward a transmitting device on its own. As such, in some scenarios (such as in the event of a beam failure between the RIS and a transmitting device, such as a base station), an RIS may be in a position of searching for a suitable receive beam to use for receiving communications from a transmitting device, and the configuring or controlling node of the RIS may be unable to assist.

In some implementations of the present disclosure, communicating devices within a communications system supported by an RIS may employ a two-step beam training procedure to reduce a quantity of joint beam patterns that the RIS scans to select or otherwise find a suitable configuration for reflecting communications between a base station and a user equipment (UE). The two-step beam training procedure may include a first beam training procedure between a base station and an RIS and a second beam training procedure between the base station and a UE via the RIS. As part of the first beam training procedure, the RIS may cycle through a set of RIS configurations that correspond to a subset of possible beam pair hypotheses (for reflecting communications between the base station and the UE) and the base station or the RIS, or both, may obtain statistical information on a suitable or correct RIS beam toward the base station. In some implementations, for example, the base station or the RIS, or both, may calculate a different success ratio for each of the set of RIS configurations and may use the success ratios to identify or otherwise determine which receive beam at the RIS, of a set of possible receive beams at the RIS, is most likely oriented toward the base station. The base station may transmit, to the RIS, an indication of the identified or determined receive beam and the RIS may identify a subset of RIS configurations based on the receive beam (e.g., such that the subset of RIS configurations may be commonly associated with use of the indicated receive beam at the RIS and different reflected beams from the RIS). As part of the second beam training procedure, the base station may transmit one or more reference signals to the UE via the RIS as the RIS cycles through the subset of RIS configurations and the RIS may identify or otherwise determine an RIS configuration, from the subset of RIS configurations, to use for reflecting communications between the base station and the UE based on the second beam training procedure.

Particular implementations of the subject matter described in this disclosure can be implemented to realize one or more of the following potential advantages. For example, as a result of implementing the two-step beam training procedure described herein, an RIS may cycle through fewer RIS configurations, which may support lower complexity or less time-consuming beam training procedures involving an RIS. Further, a base station or an RIS (or a node capable of configuring or controlling the RIS), or both, may efficiently identify a suitable receive beam at the RIS for receiving communications from the base station in accordance with implementing the procedural- or signaling-based mechanisms described herein, which may be especially helpful in supporting reliable and robust communication in scenarios associated with a beam failure (such as a beam failure between the base station and the RIS). Moreover, as a result of supporting more reliable and robust communication in deployments involving an RIS, communicating devices may achieve better coverage (e.g., larger coverage areas). Due to such greater reliability and robustness and better coverage, communicating devices may further experience greater spectral efficiency, higher data rates, and increased system capacity, among other benefits.

Aspects of the disclosure are initially described in the context of wireless communications systems. Aspects of the disclosure are additionally illustrated by and described herein with reference to a beam training procedure, beam pair hypotheses, and a process flow. Aspects of the disclosure are further illustrated by and described herein with reference to apparatus diagrams, system diagrams, and flowcharts that relate to beam acquisition for a reconfigurable intelligent surface.

FIG. 1 shows an example of a wireless communications system 100 that supports beam acquisition for an RIS in accordance with aspects of the present disclosure. The wireless communications system 100 may include one or more base stations 105, one or more UEs 115, and a core network 130. In some examples, the wireless communications system 100 may be a Long Term Evolution (LTE)

network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of an RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described herein with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some systems, such as the wireless communications system 100, two or more devices or nodes (which may be examples of any one or more of UEs 115, one or more base stations 105, one or more TRPs, one or more sidelink devices, one or more relay devices, one or more small cells, or any other device capable of wirelessly communicating with at least one other device) may attempt to establish a communication link over an RF band. In some aspects, such as in aspects in which the RF band includes or is an example of a mmW, FR2, or FR4 (such as about 52.6 GHz to about 71 GHZ) RF band, the two or more devices or nodes may attempt to establish the communication link using a beamforming technique. For example, the two or more devices or nodes may apply beam weights to one or more antenna elements or panels to align reception or transmission of wireless signaling in one of various directions. A link between two communicating devices established via beamforming may be referred to herein as a beam pair link. A beam pair link may refer to or include a first beam and a second beam, where the first beam may be used by a first device to transmit to or receive from a second device and the second beam may be used by the second device to transmit to or receive from the first device.

In some implementations, a base station 105 and a UE 115 may attempt to establish a communication link with each other using a beamforming technique and via an assisting device controlled by an assisting node. In some aspects, such an assisting device may include or be an example of an RIS and such an assisting node may include or be an example of a central unit (CU) or some other device capable of CU functionality (e.g., any device capable of wirelessly transmitting or receiving or capable of configuring or otherwise controlling one or more assisting devices). In some implementations, the base station 105 and the UE 115 may attempt to establish the communication link via an RIS based on a two-step beam training procedure according to which the base station 105 and the RIS initially select a suitable receive beam for the RIS to use for receiving communications from the base station 105 and according to which the RIS subsequently cycles through a subset of configurations associated with the selected suitable receive beam. As such, the RIS may cycle through fewer configurations, which may support lower complexity or less time-consuming beam establishment (or re-establishment) procedures.

FIG. 2 shows examples of wireless communications systems 200 and 201 that support beam acquisition for an RIS in accordance with aspects of the present disclosure. The wireless communications systems 200 and 201 may implement or be implemented to realize aspects of the wireless communications system 100. For example, the wireless communications systems 200 and 201 both illustrate communication between one or more UEs 115 and one or more base stations 105, which may be examples of corresponding devices described herein, including with reference to FIG. 1. In some implementations, a UE 115 and a base station 105 may establish a communication link via an RIS 205 and the RIS 205 (or a CU of the RIS 205) may configure a reflection characteristic of the RIS 205 in accordance with a two-step beam training procedure.

Some systems may employ massive MIMO (such as 5G massive MIMO) to increase an achievable throughput between two communicating devices, and such systems may extend coverage via one or more active antenna units or one or more passive reflective surfaces (such as RISs), or any combination thereof. For example, and as illustrated by the wireless communications system 200 in which a base station 105-*a* transmits to a UE 115-*a* via a beam 215-*a* and a base station 105-*b* transmits to a UE 115-*b* via a beam 215-*b*, some systems may achieve a relatively higher beamforming gain by using active antenna units. In some aspects, such active antenna units may be associated with a use of individual RF chains per antenna ports. Such systems may experience a significant increase in power consumption due to the use of active antenna units.

For example, the wireless communications system 200 may include an object 230-*a* that blocks or otherwise inhibits a line-of-sight (LoS) link between the base station 105-*a* and the UE 115-*b*. As such, the wireless communications system 200 may include the base station 105-*b*, featuring an active antenna unit, to support wireless communications with the UE 115-*b* (as the base station 105-*a* may be unable to support wireless communications with the UE 115-*b* due to a location of the object 230-*a* and a location of the UE 115-*b*). Thus, to support wireless communications with both the UE 115-*a* and the UE 115-*b*, the wireless communications system 200 may deploy two base stations 105 each operating separate active antenna units, which may be associated with an increase in power consumption. Further, although illustrated to show two base stations 105, the wireless communications system 200 may additionally or alternatively deploy one or more other devices capable of supporting an active antenna unit, such as a relay node or a smart repeater, to support wireless communications with both the UE 115-*a* and the UE 115-*b*.

Some systems (such as the wireless communications system 201) may, in addition or as an alternative to deploying additional active antenna units, employ the use of one or more assisting devices, such as one or more RISs 205, to extend coverage (such as 5G coverage) with a negligible or relatively small increase in power consumption. In other words, some systems (e.g., including the wireless communications system 201) may leverage passive MIMO as a substitute for an active antenna unit. For example, an RIS 205 may be a near-passive device capable of reflecting an impinging or incident wave to a desired location or in a desired direction.

As illustrated in the wireless communications system 201, for example, a base station 105-*c* may use the RIS 205 to reflect communications from the base station 105-*c* via a beam 215-*d* (directed to the RIS 205) to a UE 115-*d* via a beam 215-*e* (directed from the RIS 205 to the UE 115) to avoid an object 230-*b*. As such, the base station 105-*c* (e.g., a single base station 105 operating an active antenna unit) may communicate (directly) with a UE 115-*c* via a beam 215-*c* and may communicate (indirectly, due to a location of the object 230-*b* and the UE 115-*d*) with the UE 115-*d* via the RIS 205. A node or CU, such as an RIS CU 220, may configure a reflection characteristic of the RIS 205 to control the reflection direction from the RIS 205 and, in some aspects, a base station 105 may configure or control the node or CU (such that the base station 105 may effectively configure or control the reflection direction of the RIS 205). For example, a base station 105-*c* may transmit messaging to the RIS CU 220 indicating a configuration of the RIS 205 and the RIS CU 220 may configure the RIS 205 accordingly. In some aspects, a configuration of the RIS 205 may be associated with a receive beam, such as a directional beam or configuration for directional "reception" of signaling, and a reflected beam, such a directional beam or configuration for directional reflection of the signaling. Further, although described herein as a "receive" beam, a receive beam associated with a configuration of the RIS 205 may refer to reception as part of a reflecting (as opposed to, for example, as part of a decoding).

An RIS 205 may function similarly to a mirror or other reflective surface in its ability to reflect incident beams or waves (such as light waves), but may differ in that an RIS 205 may include one or more components that are able to control or dictate how an incident beam or wave is reflected (such that an angle of incidence can be different than an angle of reflection) or that are able to control or dictate a shape of a reflected beam or wave (such as via energy focusing or energy nulling via constructive interference or destructive interference, respectively), or both. For example, an RIS 205 may include a quantity of reflective elements 210 that each have a controllable delay, phase, or polarization, or any combination thereof, and the RIS CU 220 may control or configure each of the reflective elements 210 to control how an incident beam or wave is reflected or to control a shape of a reflected beam or wave. An RIS 205 may be an example of or may otherwise be referred to as a software-controlled metasurface, a configurable reflective surface, a reflective intelligent surface, or a configurable intelligent surface, and may sometimes be a metal surface (such as a copper surface) including a quantity of reflective elements 210. In some aspects, an RIS CU 220 may be coupled with an RIS 205 via hardware (such as via a fiber optic cable). In some other aspects, an RIS CU 220 may be non-co-located with an RIS 205 and may configure the RIS 205 via over-the-air signaling.

In some aspects, the RIS CU 220 may have both transmission and reception capability via one or more antennas 225. The RIS CU 220 may use its transmission and reception capability to assist in establishing an RRC connection between the base station 105-*c* and the RIS CU 220. For example, the base station 105-*c* may sweep over a set of synchronization signal block (SSB) beams and the RIS CU 220 may measure each of the set of SSB beams and respond with a random access channel (RACH) preamble corresponding to a strongest of the set of SSB beams. As such, the base station 105-*c* may learn (based on receiving the RACH preamble response from the RIS CU 220) which beam to use to communicate with the RIS CU 220. The base station 105-*c* may use the same beam to transmit signaling to the RIS 205 (such as to "light up" a surface of the RIS 205), which may support or otherwise facilitate a beam training procedure between the base station 105-*c* and the UE 115-*d* via the RIS 205 (as described in more detail herein, including with reference to FIG. 3).

The RIS CU 220, however, may be incapable of configuring a beam of the RIS 205 toward the base station 105-*c*. For example, a quantity of antenna elements at the RIS CU 220 may not be comparable to a quantity of antenna elements (such as reflective elements 210) at the surface of the RIS 205. In other words, for instance, the one or more antennas 225 of the RIS CU 220 may support relatively few antenna elements as compared to the quantity of reflective elements 210 at the surface of the RIS 205. As such, the base station 105-*c* or the RIS 205, or both, may perform one or more measurements to fix a beam of the RIS 205 toward the base station 105-*c* at deployment (and, in addition, the RIS CU 220 may establish an RRC connection with the base station 105-*c* based on the transmission and reception capability of the RIS CU 220).

Although a location and an orientation of the base station 105-*c* and the RIS 205 may be fixed, it is possible that a beam failure between the base station 105-*c* and the RIS 205 may occur due to a change in an environment between the base station 105-*c* and the RIS 205 (e.g., a movement or placement of the object 230-*b* between the base station 105-*c* and the UE 115-*d*). In the event of a beam failure between the base station 105-*c* and the RIS 205, the base station 105-*c* may select a new beam to use to re-establish a connection with the RIS CU 220 and the RIS 205 may select a new beam toward the base station 105-*c*. The RIS CU 220, however, may be unable to assist with such a selection of a new beam toward the base station 105-*c*, which may result in uncertainty at the RIS 205 regarding which reflection configuration (of potentially many reflection configurations) the RIS 205 may use to reflect communications from the base station 105-*c* to the UE 115-*d*.

In such examples in which the RIS 205 does not know a correct beam toward the base station 105-*c*, the RIS 205 (or the RIS CU 220) may cycle between different (and potentially a relatively large quantity of) configurations of the RIS 205 to effectively sweep across both different receive beams and different reflected beams to find a suitable pair for reflecting communications from the base station 105-*c* to the UE 115-*d*. In other words, for example, the RIS 205 may sweep across different possible receive beams to find, measure, or otherwise select a suitable receive beam that is oriented toward the base station 105-*c* and may sweep across different possible reflected beams (which may be equivalently referred to herein as transmit beams) to find, measure, or otherwise select a suitable reflected beam that is oriented toward the UE 115-*d*.

Such a cycling between the different configurations of the RIS 205 to sweep across different possible pairs of a receive beam and a reflected beam may be associated with an increase (such as a substantial increase relative to a beam training procedure without involving the RIS 205) in a quantity of beam pair hypotheses associated with the beam training procedure between the base station 105-*c* and the UE 115-*d*. For example, if the RIS 205 is capable of four different receive beams and four different reflected beams, the base station 105-*c*, the UE 115-*c*, and the RIS 205 may participate in a beam training procedure involving 16 different beam pair hypotheses at the RIS 205 (e.g., without factoring in any additional beam sweeping at either or both of the base station 105-*c* or the UE 115-*d*). Additional details relating to such extension of the beam training procedure to involve beam sweeping at a base station 105 and an RIS 205 are illustrated by and described herein with reference to FIG. 3, and additional details relating to an example of 16 different beam pair hypotheses at an RIS 205 are illustrated by and described herein with reference to FIG. 4.

In some implementations, the base station 105-*c*, the UE 115-*d*, and the RIS 205, or any combination thereof, may perform or otherwise participate in a two-step beam training procedure according to which the RIS 205 (or the RIS CU 220) finds, measures, or otherwise selects a first beam to use as a receive beam for communications from the base station 105-*c* based on a first beam training procedure and according to which the RIS 205 (or the RIS CU 220) finds, measures, or otherwise selects a configuration for the RIS 205 for reflecting communications from the base station 105-*c* to the UE 115-*d* based on a second beam training procedure.

In some examples, the first beam training procedure may be between the base station 105-*c* and the RIS 205 and may be based on statistical data. In such examples, the RIS 205 or the base station 105-*c*, or both, may infer, assume, or select a correct or otherwise suitable RIS beam toward the base station 105-*c* for directional reception at the RIS 205 from the base station 105-*c*. The second beam training procedure may be between the RIS 205 and the UE 115-*d* and may be based on the RIS 205 cycling between a subset of RIS configurations that are commonly associated with use of the correct or otherwise suitable RIS beam toward the base station 105-*c* while the base station 105-*c* transmits one or more reference signals toward the RIS 205. As such, the UE 115-*d* may measure any received reference signals. Based on the measurements, the base station 105-*c* (if informed of the measurements) or the UE 115-*d* may identify or otherwise determine which configuration of the RIS 205 provides a greatest or otherwise suitable receive strength at the UE 115-*d* based on the measurements (and, in some examples, based on a configured or known order according to which the RIS 205 cycles between the subset of RIS configurations).

Figure 3:
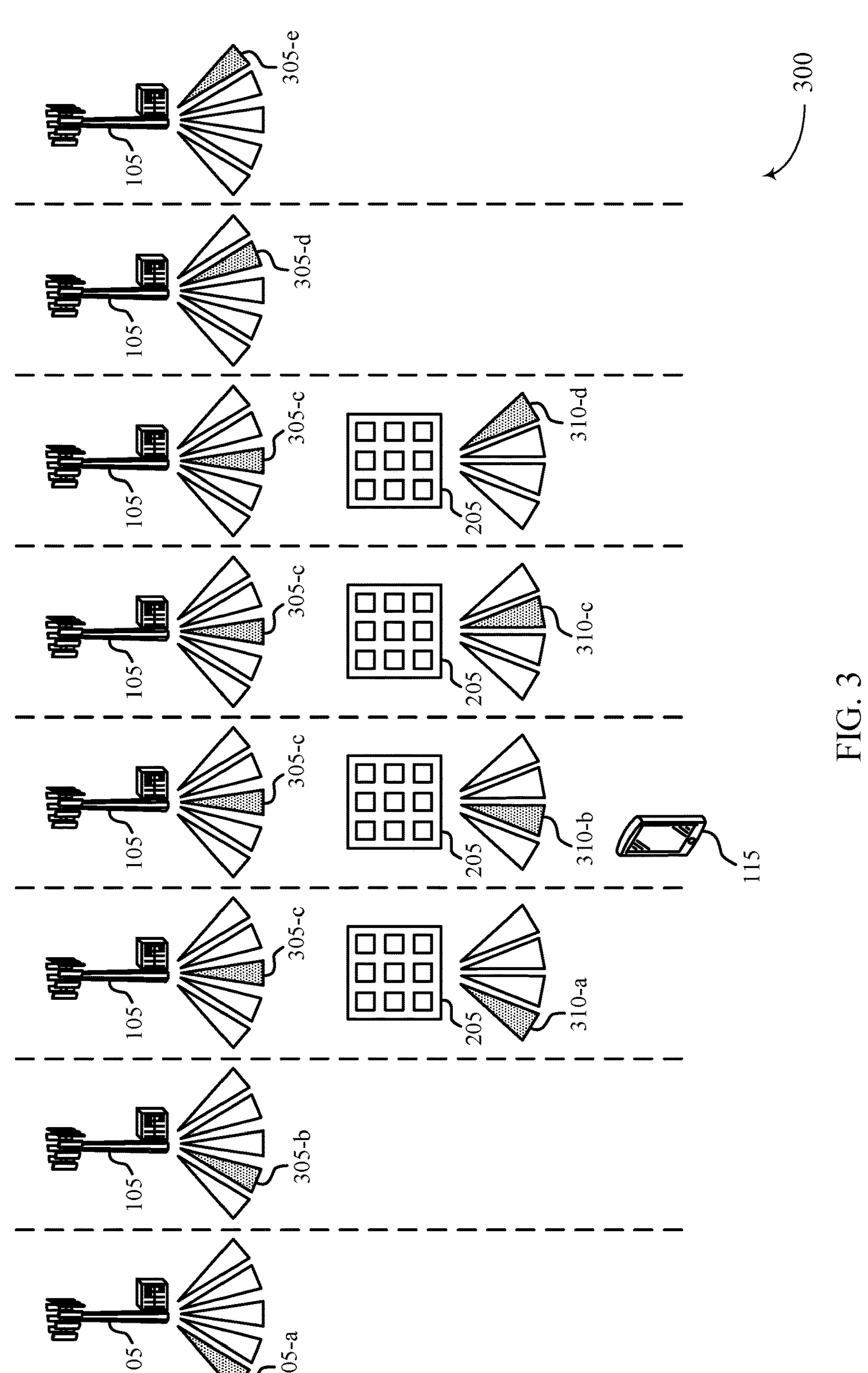
FIG. 3 shows an example of a beam training procedure that supports beam acquisition for an RIS in accordance with aspects of the present disclosure.

FIG. 3 shows an example of a beam training procedure 300 that supports beam acquisition for an RIS in accordance with aspects of the present disclosure. The beam training procedure 300 may implement or be implemented to realize aspects of the wireless communications system 100, the wireless communications system 200, or the wireless communications system 201. For example, the beam training procedure 300 illustrates a beam planning between a base station 105 and a UE 115 via an RIS 205, which may be examples of corresponding devices described herein, including with reference to FIGS. 1 and 2. In some implementations, the base station 105, the UE 115, and the RIS 205 may perform the beam training procedure 300 to establish a communication link between the base station 105 and the RIS 205 and a communication link between the RIS 205 and the UE 115 to extend a coverage of the base station 105.

For example, with proper or suitable beam planning at the base station 105 and the RIS 205 (such as via multi-beam initial access for the RIS 205), an initial access procedure between the base station 105 and the UE 115 may be modified to accommodate beam sweeping at the RIS 205. As part of the beam training procedure 300, the base station 105 may repeat a subset of beams 305 toward the RIS 205 to enable or otherwise allow the RIS 205 to perform beam sweeping. For example, the base station 105 may transmit one or more reference signals via different beams 305, including a beam 305-*a*, a beam 305-*b*, a beam 305-*c*, a beam 305-*d*, and a beam 305-*e*, across different measurement occasions and the base station 105 may repeatedly transmit one or more reference signals using the beam 305-*c* (which may focus signaling toward the RIS 205) to enable or allow the RIS 205 to cycle between different configurations of the RIS 205 (where different configurations of the RIS 205 may be associated with different reflected beams 310). In some aspects, the one or more reference signals that the base station 105 transmits via different beams 305 may include SSBs (such that the beams 305 may be equivalently referred to herein as SSB beams). For example, the beam 305-*a* may be referred to or understood as an SSB beam 0, the beam 305-*b* may be referred to or understood as an SSB beam 1, the beam 305-*c* may be referred to or understood as an SSB beam 2, the beam 305-*d* may be referred to or understood as an SSB beam 3, and the beam 305-*e* may be referred to or understood as an SSB beam 4. In some aspects, the base station 105 may transmit eight different SSB beams (e.g., up to an SSB beam 7).

The RIS 205 may cycle between a variety of different configurations (such as four different configurations) to reflect the signaling from the base station 105 in different directions. For example, the RIS 205 may reflect signaling from the base station 105 in a first direction via a reflected beam 310-*a* if using a first configuration, in a second direction via a reflected beam 310-*b* if using a second configuration, in a third direction via a reflected beam 310-*c* if using a third configuration, and in a fourth direction via a reflected beam 310-*d* if using a fourth configuration. In some aspects, the RIS 205 may use a different configuration during different measurement occasions of the beam training procedure 300. The UE 115 may measure a signal strength during each of the measurement occasions, identify during which measurement occasion the UE 115 measures a greatest or otherwise suitable signal strength, and may report or otherwise respond to the one or more reference signals sent from the base station 105 with a message indicating the measurement occasion associated with the greatest or otherwise suitable signal strength (e.g., the strongest beam). The base station 105 may receive the message from the UE 115 and configure a transmit beam of the base station 105 and the configuration of the RIS 205 (e.g., a reflected beam from the RIS 205) according to the feedback from the UE 115. As such, the beam training procedure 300 may be transparent to the UE 115 (e.g., the UE 115 may be unaware of a presence or configuration of the RIS 205).

In accordance with the implementations disclosed herein, the base station 105, the UE 115, and the RIS 205 may participate in a two-step beam training procedure to reduce a quantity of hypotheses that the RIS 205 may test if the RIS 205 (or a CU of the RIS 205) experiences a beam failure or otherwise loses a connection with the base station 105. As part of the two-step beam training procedure, the RIS 205 (or the CU of the RIS 205) may find, measure, or otherwise select a first beam to use as a receive beam for communications from the base station 105 based on a first beam training procedure and the RIS 205 (or the CU of the RIS 205) may find, measure, or otherwise select, from a reduced subset of configurations, a configuration for the RIS 205 for reflecting communications from the base station 105 to the UE 115 based on a second beam training procedure. Additional details relating to such a two-step beam training procedure are illustrated by and described herein with reference to FIG. 4.

Figure 4:
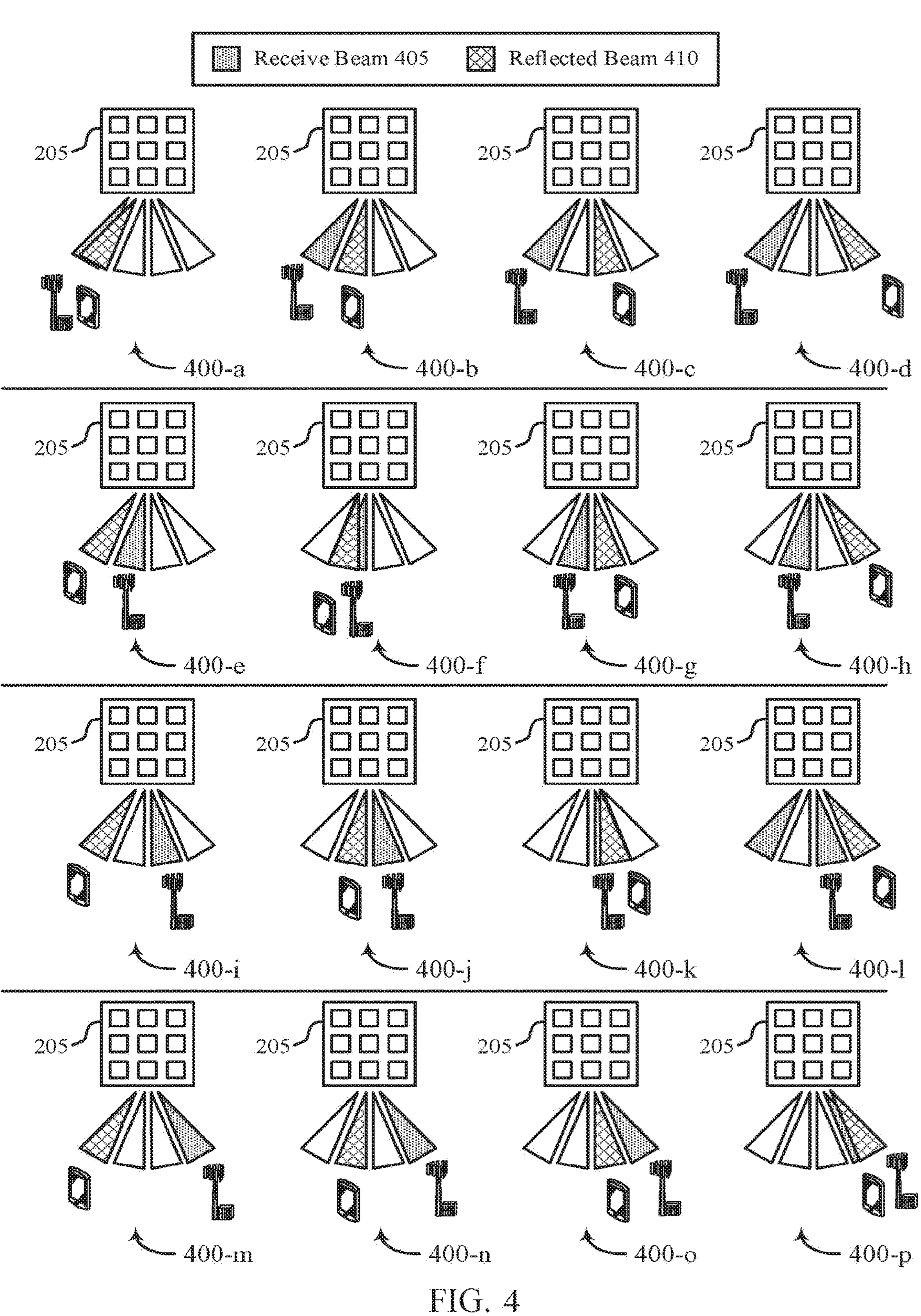
FIGS. 4 and 5 show examples of beam pair hypotheses that support beam acquisition for an RIS in accordance with aspects of the present disclosure.

FIG. 4 shows example beam pair hypotheses 400 that support beam acquisition for an RIS in accordance with aspects of the present disclosure. The beam pair hypotheses 400 may implement or be implemented to realize aspects of the wireless communications system 100, the wireless communications system 200, the wireless communications system 201, or the beam training procedure 300. For example, the beam pair hypotheses 400 illustrate possible example beam pairs (e.g., beam pairs including a receive beam 405 and a reflected beam 410) that an RIS 205 may test as part of a beam training procedure between a base station 105 and a UE 115 via the RIS 205, and such devices may be examples of corresponding devices described herein, including with reference to FIGS. 1-3.

In some example implementations, the RIS 205 may support four different receive beams 405 (e.g., four different candidate locations of the base station 105) and four different reflected beams 410 (e.g., four different candidate locations of the UE 115) and, as such, there may be 16 different beam pair hypotheses 400 that the RIS 205 may test to select a suitable beam pair for reflecting communications between the base station 105 and the UE 115. Such different beam pair hypotheses 400 may include a beam pair hypothesis 400-*a*, a beam pair hypothesis 400-*b*, a beam pair hypothesis 400-*c*, a beam pair hypothesis 400-*d*, a beam pair hypothesis 400-*e*, a beam pair hypothesis 400-*f*, a beam pair hypothesis 400-*g*, a beam pair hypothesis 400-*h*, a beam pair hypothesis 400-*i*, a beam pair hypothesis 400-*j*, a beam pair hypothesis 400-*k*, a beam pair hypothesis 400-*l*, a beam pair hypothesis 400-*m*, a beam pair hypothesis 400-*n*, a beam pair hypothesis 400-*o*, and a beam pair hypothesis 400-*p*.

In some aspects, a configuration of the RIS 205 (e.g., a configuration of a reflection characteristic of the RIS 205) may be the same for different beam pair hypotheses 400, which may, in some implementations, enable or otherwise facilitate a reduction in a quantity of beam pair hypotheses 400 that the RIS 205 may test (even though the RIS 205 may be unaware of the location of the base station 105). For example, an RIS configuration may depend or be based on a summation of an angle-of-arrival (AoA) and an angle-of-departure (AoD). Thus, an RIS configuration may be the same for different beam pair hypotheses 400 that have a same AoA+AoD. The beam pair hypotheses 400 may be associated with different example AoA+AoD values in accordance with Table 1, shown below.

TABLE 1

| Beam Pair Hypothesis | AoA + AoD Value |
|---|---|
| 400-a | −60° |
| 400-b | −40° |
| 400-c | −20° |
| 400-d | 0° |
| 400-e | −40° |
| 400-f | −20° |
| 400-g | 0° |
| 400-h | 20° |
| 400-i | −20° |
| 400-j | 0° |
| 400-k | 20° |
| 400-l | 40° |
| 400-m | 0° |
| 400-n | 20° |
| 400-o | 40° |
| 400-p | 60° |

In this example, the communicating devices (e.g., the base station 105, the UE 115, and the RIS 205) may reduce a quantity of beam pair hypotheses 400 that the devices may test from 16 beam pair hypotheses 400 to seven beam pair hypotheses (without any knowledge about a correct or suitable receive beam 405 toward the base station 105). For example, instead of testing each of the 16 beam pair hypotheses 400, the RIS 205 may test seven beam pair hypotheses 400 including the beam pair hypothesis 400-*a*, the beam pair hypothesis 400-*b*, the beam pair hypothesis 400-*c*, the beam pair hypothesis 400-*d*, the beam pair hypothesis 400-*h*, the beam pair hypothesis 400-1, and the beam pair hypothesis 400-*p*, as such seven beam pair hypotheses 400 may cover the possible example AoA+AoD values that the RIS 205 supports. Additional details relating to use of a single configuration of the RIS 205 for multiple different beam pair hypotheses 400 are illustrated by and described herein with reference to FIG. 5. In some aspects, the RIS 205 may leverage properties associated with Equation 1 to support such a reduced hypothesis set.

$$\sin(\text{theta }1) + \sin(\text{theta }2) = 2 * \sin(\text{theta }3) \tag{1}$$

In accordance with the examples disclosed herein, the base station 105, the UE 115, and the RIS 205 may perform or otherwise participate in a two-step beam training procedure according to which the RIS 205 may select two beams including a receive beam 405 toward the base station 105 and a reflected beam 410 toward the UE 115. To reduce the number of joint beam patterns that the RIS 205 scans, the RIS 205 may select a receive beam 405 toward the base station 105 based on training data or statistics using the reduced set of beam pair hypotheses 400 as part of a first beam training procedure of the two-step beam training procedure and may select a reflected beam 410 toward the UE 115 based on an RIS beam sweep toward the UE 115 as part of a second beam training procedure of the two-step beam training procedure.

As part of the first beam training procedure, for example, the RIS 205 may cycle between different configurations of the RIS 205 corresponding to the reduced set of seven beam pair hypotheses 400. The base station 105 may transmit one or more reference signals toward the RIS 205 while the RIS 205 cycles between the different configurations of the RIS 205 corresponding to the reduced set of seven beam pair hypotheses 400. The base station 105 or the RIS 205, or both, may generate or otherwise obtain the training data or statistics based on an assumption of a uniform distribution of UEs 115 in a field-of-view (FoV) of the RIS 205 (and based on an assumption of no a priori knowledge regarding a best, correct, or otherwise suitable receive beam 405 from the RIS 205 toward the base station 105. In other words, the base station 105 or the RIS 205, or both, may calculate or obtain $P_1, \ldots, P_7$ statistically (such that they represent the success ratio for each RIS configuration hypothesis) and, in some examples, $P_1 + \ldots + P_{7=1}$. In some aspects, the base station 105 or the RIS 205, or both, may generate or obtain the training data or statistics with the assistance of an RIS CU 220. In some implementations, the base station 105 or the RIS 205, or both, may observe, measure, or otherwise calculate a distribution of selected beam pair hypotheses 400 for the configuration of the RIS 205 as illustrated by Table 2, shown below.

TABLE 2

| Hypothesis for RIS Configuration | Success Ratio | Quantity of Original Hypotheses Mapped to this Hypothesis | Success Ratio for Each Original Hypothesis Mapped to this Hypothesis |
|---|---|---|---|
| AoA + AoD = −60° | $P_1$ | 1 | $P_1$ |
| AoA + AoD = −40° | $P_2$ | 2 | $P_2/2$ |
| AoA + AoD = −20° | $P_3$ | 3 | $P_3/3$ |
| AoA + AoD = 0 | $P_4$ | 4 | $P_4/4$ |
| AoA + AoD = 20° | $P_5$ | 3 | $P_5/3$ |
| AoA + AoD = 40° | $P_6$ | 2 | $P_6/2$ |
| AoA + AoD = 60° | $P_7$ | 1 | $P_7$ |

As illustrated by Table 2, the base station 105 or the RIS 205, or both, may determine that a first RIS configuration associated with an AoA+AoD=−60° has a success ratio of $P_1$, a second RIS configuration associated with an AoA+AoD=−40° has a success ratio of $P_2$, a third RIS configuration associated with an AoA+AoD=−20° has a success ratio of $P_3$, a fourth RIS configuration associated with an AoA+AoD=0° has a success ratio of $P_4$, a fifth RIS configuration associated with an AoA+AoD=20° has a success ratio of $P_5$, a sixth RIS configuration associated with an AoA+AoD=40° has a success ratio of $P_6$, and a seventh RIS configuration associated with an AoA+AoD=60° has a success ratio of $P_7$. Each of the different RIS configurations may be associated with a quantity of beam pair hypotheses 400 (as outlined by Table 1) and the base station 105 or the RIS 205, or both, may determine that each beam pair hypothesis 400 associated with a given RIS configuration contribute equally to the success ratio of that RIS configuration. For example, and as illustrated by Table 2, an RIS configuration associated with an AoA+AoD=0° may be further associated with four different beam pair hypotheses 400 and, as such, each of the four different beam pair hypotheses 400 may be attributed with a success ratio of $P_4/4$.

The base station 105 or the RIS 205, or both, may calculate a value (e.g., another success ratio) associated with each of a set of possible receive beams 405 from the RIS 205 toward the base station 105 based on the success ratios of each RIS configuration. For example, the base station 105 or the RIS 205, or both, may calculate values for different receive beams 405 in accordance with an AoD (which may be equivalently understood as an AoA) of the receive beam 405, as illustrated by Table 3, shown below.

TABLE 3

| Hypothesis for RIS beam Toward Base Station 105 (Receive Beam 405) | Value (Success Ratio) for Each RIS Beam Toward Base Station 105 |
|---|---|
| AoD = −30° | $\frac{P_4}{4} + \frac{P_3}{3} + \frac{P_2}{2} + P_1$ |
| AoD = −10° | $\frac{P_4}{4} + \frac{P_5}{3} + \frac{P_3}{3} + \frac{P_2}{2}$ |
| AoD = 10° | $\frac{P_4}{4} + \frac{P_5}{3} + \frac{P_3}{3} + \frac{P_6}{2}$ |
| AoD = 30° | $\frac{P_4}{4} + \frac{P_5}{3} + \frac{P_6}{2} + P_7$ |

In other words, the base station 105 or the RIS 205, or both, may calculate a value (e.g., a success ratio or a likelihood for that receive beam 405 to be a correct or suitable receive beam 405 toward the base station 105) for each receive beam 405 of the set of possible receive beams 405 from the RIS 205 toward the base station 105. The base station 105 or the RIS 205, or both, may determine which value is a greatest or more suitable value relative to a remainder of the calculated values. In other words, for example, once sufficient data is collected, the base station 105 or the RIS 205, or both, may select or choose a hypothesis for an RIS beam toward the base station 105 with the highest value or success ratio.

In some implementations, the base station 105 or the RIS 205, or both, may, as part of the first beam training procedure, decide to eliminate a subset of the beam pair hypotheses 400 without making a final decision or conclusion about a correct or suitable receive beam 405 toward the base station 105. In some scenarios, for example, some receive beams 405 may be associated with relatively smaller values (e.g., success ratios) while some other receive beams 405 may have similarly relatively larger values (e.g., success ratios). In other words, some rows (e.g., AoDs) of Table 3 may have relatively small values or success ratios (and, as such, may be eliminated, ruled out, or pruned from the decision making process) while some other rows (e.g., AoDs) of Table 3 may have relatively large values or success ratios that are within a threshold range of each other (and, as such, the base station 105 or the RIS 205, or both, may be unable to select or differentiate between such rows with a suitable or relatively high level of accuracy or confidence).

In an example, the base station 105 or the RIS 205, or both, may eliminate a hypothesis set associated with a receive beam 405 of AoD=−30° (including the beam pair hypothesis 400-*a*, the beam pair hypothesis 400-*b*, the beam pair hypothesis 400-*c*, and the beam pair hypothesis 400-*d*) and a hypothesis set associated with a receive beam 405 of AoD=30° (including the beam pair hypothesis 400-*m*, the beam pair hypothesis 400-*n*, the beam pair hypothesis 400-*o*, and the beam pair hypothesis 400-*p*) if both hypothesis sets are associated with receive beams 405 that have relatively low success ratios. Based on (e.g., after) the partial hypothesis set elimination, the RIS 205 may identify another subset of RIS configurations that cover a remaining set of potential AoA+AoD values of the remaining beam pair hypotheses 400. For example, the RIS 205 may cycle between an RIS configuration associated with an AoA+AoD=−40°, an RIS configuration associated with an AoA+AoD=−20°, an RIS configuration associated with an AoA+AoD=0°, an RIS configuration associated with an AoA+AoD=20°, and an RIS configuration associated with an AoA+AoD=40°. As such, the RIS 205 may cycle across five different RIS configurations and the base station 105 or the RIS 205, or both, may calculate or otherwise obtain a set of success ratios for the five different RIS configurations as illustrated by Table 4, shown below.

TABLE 4

| Hypothesis for RIS Configuration | Success Ratio | Quantity of Original Hypotheses Mapped to this Hypothesis | Success Ratio for each Original Hypothesis Mapped to this Hypothesis |
|---|---|---|---|
| AoA + AoD = −40° | $P_1$ | 1 | $P_1$ |
| AoA + AoD = −20° | $P_2$ | 2 | $P_2/2$ |
| AoA + AoD = 0° | $P_3$ | 2 | $P_3/2$ |
| AoA + AoD = 20 | $P_4$ | 2 | $P_4/2$ |
| AoA + AoD = 40° | $P_5$ | 1 | $P_5$ |

In other words, the base station 105 or the RIS 205, or both, may modify, update, or re-calculate the statistics of the first beam training procedure based on (e.g., after) the partial hypothesis elimination. Such a modification, update, or re-calculation of the statistics of the first beam training procedure may be referred to as a second iteration of the first beam training procedure, and may be based on the base station 105 transmitting one or more reference signals while the RIS 205 cycles across the reduced subset of (e.g., five) RIS configurations. To support a common understanding of the partial hypothesis set elimination, the base station 105 may signal, to the RIS 205, an indication of the indices of the hypothesis sets that the RIS 205 may eliminate. In the example described herein involving the elimination of the hypothesis set associated with a receive beam 405 of AoD=−30° and the hypothesis set associated with a receive beam 405 of AoD=30°, for instance, the base station 105 may transmit an indication of the indices corresponding to the two hypothesis sets to the RIS 205 as eliminated hypothesis sets.

In some implementations, the RIS 205 and the base station 105 may agree or coordinate on an order according to which the RIS configuration is swept based on (e.g., after) the partial hypothesis set elimination. For example, the base station 105 may transmit an indication to the base station 105 indicating an order according to which the RIS 205 is to cycle between the reduced subset of RIS configurations. As such, the base station 105 may accurately track the beam training statistics and accurately select a final hypothesis set for the second beam training procedure. Further, in some implementations, one or both of the base station 105 or the RIS 205 may change their beam planning after such an indication of the eliminated hypothesis sets. However, in some scenarios, at least a subset of SSB beams may be identical to SSB beams used during the initial attempt of the first beam training procedure (e.g., prior to the partial hypothesis set elimination). As such, the base station 105 may provide information to the UE 115 indicating how, or if, the UE 115 is to update QCL relationships based on the partial hypothesis set elimination. For example, the base station 105 may transmit, to the UE 115, an indication of which SSB beams are obsolete (e.g., have been eliminated due to the partial hypothesis set elimination). The UE 115 may use this information to infer which QCL relationships are no longer valid (e.g., no longer hold) and may measure one or more reference signals from the base station 105 accordingly.

The base station 105 or the RIS 205, or both, may calculate or obtain a value for each possible receive beam 405 associated with the reduced subset of RIS configurations as illustrated by Table 5, shown below. Accordingly, the base station 105 or the RIS 205, or both, may select a receive beam 405 in accordance with which receive beam 405 has a greatest or suitable value (e.g., success ratio) relative a remainder of possible (and non-eliminated) receive beams 405.

TABLE 5

| Hypothesis for RIS beam Toward Base Station 105 (Receive Beam 405) | Value (Success Ratio) for Each RIS Beam Toward Base Station 105 |
|---|---|
| AoD = −10° | $\frac{P_4}{2}+\frac{P_3}{2}+\frac{P_2}{2}+P_1$ |
| AoD = 10° | $\frac{P_4}{2}+\frac{P_3}{2}+\frac{P_2}{2}+P_5$ |

In examples in which the base station 105 obtains the training data or statistics that are sufficient to fix a receive beam 405 of the RIS 205 toward the base station 105, the base station 105 may transmit an indication or message (e.g., a configuration message) to the RIS 205 (or to an RIS CU 220). The base station 105 may transmit the indication or message to the RIS 205 via RRC signaling (e.g., via an RRC configuration), a medium access control (MAC) control element (MAC-CE), downlink control information (DCI), or any combination thereof. In some aspects, such an indication or message may indicate or imply that the RIS 205 is to reduce a number of beams (e.g., reduce a quantity of RIS configurations to test) at the RIS 205 or indicate a correct or suitable RIS beam toward the base station 105 (e.g., a correct or suitable receive beam 405), or both. In examples in which the indication or message indicates a correct or suitable RIS beam toward the base station 105, the indication or message may, in other words, indicate which subset of the set of beam pair hypotheses 400 the RIS 205 may continue to test. The RIS 205 may change or adjust a beam planning and quantity of beams or RIS configurations in accordance with the indication or message.

Additionally or alternatively, in examples in which the base station 105 obtains the training data or statistics that are sufficient to fix a receive beam 405 of the RIS 205 toward the base station 105, the base station 105 may inform (e.g., via signaling, such as via RRC signaling, a MAC-CE, DCI, or any combination thereof) the UE 115 that a beam planning at the base station 105 has changed or will change. For example, the base station 105 may transmit an indication to the UE 115 indicating (explicitly or implicitly) a switch from the first beam training procedure to the second beam training procedure). Once the RIS 205 fixes a receive beam 405 toward the base station 105, the base station 105 may repeat fewer beams toward the RIS 205 and may use any remaining beams to cover a remainder of a FoV of the base station 105, which may support such a direct signaling between the base station 105 and the UE 115. In other words, based on using fewer beams to transmit one or more reference signals toward the RIS 205, the base station 105 may be able to focus signaling toward the UE 115 more effectively (such that direction communication between the base station 105 and the UE 115 is at least temporarily possible).

As a result of receiving the indication of the beam planning change, the UE 115 may discard previous or stale reference signal measurements. For example, the UE 115 may continuously measure one or more reference signals (e.g., SSBs) from the base station 105 and may average reference signal measurements (e.g., SSB measurements) over multiple frames or transmission occasions. However, if the planning of the base station 105 changes, the UE 115 may discard such averaged measurements as such averaged measurements may no longer be valid for the second beam training procedure. Further, the UE 115 may update one or more quasi-colocation (QCL) relationships between reference signals and a specific SSB beam based on the switch from the first beam training procedure to the second beam training procedure. For example, if a reference signal is QCL with a specific SSB beam, the QCL relationship between the reference signal and the specific SSB beam may no longer hold based on the beam planning switch at the base station 105 and based on the reduction of beams used by the base station 105 to transmit toward the RIS 205.

As part of the second beam training procedure, the RIS 205 may fix its beam toward the base station 105 (e.g., in accordance with the selected receive beam 405 based on the training data or statistics from the first beam training procedure) and may sweep across different reflected beams 410 toward the UE 115. This may further reduce a quantity of beam pair hypotheses 400 that the RIS 205 tests. For example, if the RIS 205 fixes a receive beam 405 at an AoD of −10°, four beam pair hypotheses 400 may be left that are associated with a common or fixed use of the receive beam 405 associated with the AoD of −10°. Such four beam pair hypotheses 400 may include the beam pair hypothesis 400-*e*, the beam pair hypothesis 400-*f*, the beam pair hypothesis 400-*g*, and the beam pair hypothesis 400-*h*. Accordingly, as part of the second beam training procedure, the base station 105 may transmit one or more reference signals toward the RIS 205 while the RIS 205 cycles between the beam pair hypothesis 400-*e*, the beam pair hypothesis 400-*f*, the beam pair hypothesis 400-*g*, and the beam pair hypothesis 400-*h*. In some aspects, the UE 115 may, in addition, sweep across a set of possible receive beams of the UE 115. In some aspects, use of the RIS 205 may be transparent to the UE 115. In some other aspects, the UE 115 may specifically look for reflected signaling from the RIS 205.

In some examples, the base station 105 may observe, measure, or otherwise detect an overall reduction in a network system efficiency based on fixing the RIS beam toward the base station 105. The base station 105 may observe, measure, or otherwise detect such a reduction in overall system efficiency based on one or more signaling failures, one or more beam failures, or a decrease in received signal strength. In such examples, the base station 105 may determine or otherwise suspect that the selected receive beam 405 was selected incorrectly. As such, the base station 105 may transmit an indication or message (e.g., another configuration message) to the RIS 205 (or to an RIS CU 220) indicating or configuring the RIS 205 to revert to a previous state (e.g., revert to using a previous RIS configuration). The RIS 205, based on receiving the configuration message, may switch back to cycling across configurations associated with the reduced set of beam pair hypotheses 400 (e.g., the seven configurations associated with the seven beam pair hypotheses 400). The RIS 205 may additionally assume no knowledge about a correct or suitable receive beam 405 toward the base station 105.

Figure 5:
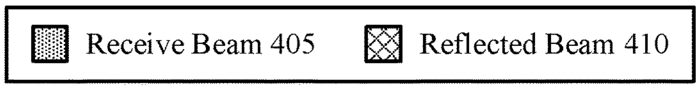
Figure 5:
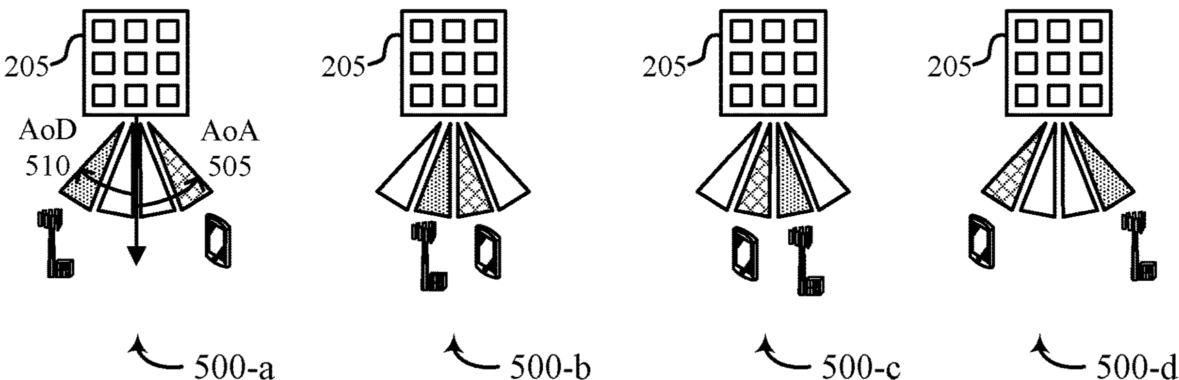

FIG. 5 shows example beam pair hypotheses 500 that support beam acquisition for an RIS in accordance with aspects of the present disclosure. The common beam pair hypotheses 500 may implement or be implemented to realize aspects of the wireless communications system 100, the wireless communications system 200, the wireless communications system 201, the beam training procedure 300, or the beam pair hypotheses 400. For example, the beam pair hypotheses 500 illustrate how an RIS 205 may reflect communications from a base station to a UE 115 via different receive beams and reflected beams using a same RIS configuration if an AoD+AoA value associated with the receive beams and the reflected beams is the same, and such devices may be examples of corresponding devices described herein, including with reference to FIGS. 1-4.

For example, based on measuring an AoA 505 from a reference point (e.g., as illustrated by a vertical line in FIG. 5) to an orientation of a reflected beam 410 and measuring an AoD 510 from the reference point to an orientation of a receive beam 405, each different beam pair at the RIS 205 may be associated with an AoA+AoD value. Further, the RIS 205 may support different beam pairs that are associated with a same AoD+AoA value based on using a same RIS configuration (e.g., a same configuration of a reflection characteristic of the RIS 205). For example, and as illustrated by the beam pair hypotheses 500, the RIS 205 may use a single, same RIS configuration to support any beam pair hypothesis 500 associated with an AoD+AoA value of 0°. For instance, each of a beam pair hypothesis 500-*a*, a beam pair hypothesis 500-*b*, a beam pair hypothesis 500-*c*, and a beam pair hypothesis 500-*d* may be associated with an AoD+AoA value of 0° and, as such, the RIS 205 may use a common RIS configuration to support each of the beam pair hypothesis 500-*a*, the beam pair hypothesis 500-*b*, the beam pair hypothesis 500-*c*, and the beam pair hypothesis 500-*d*.

Figure 6:
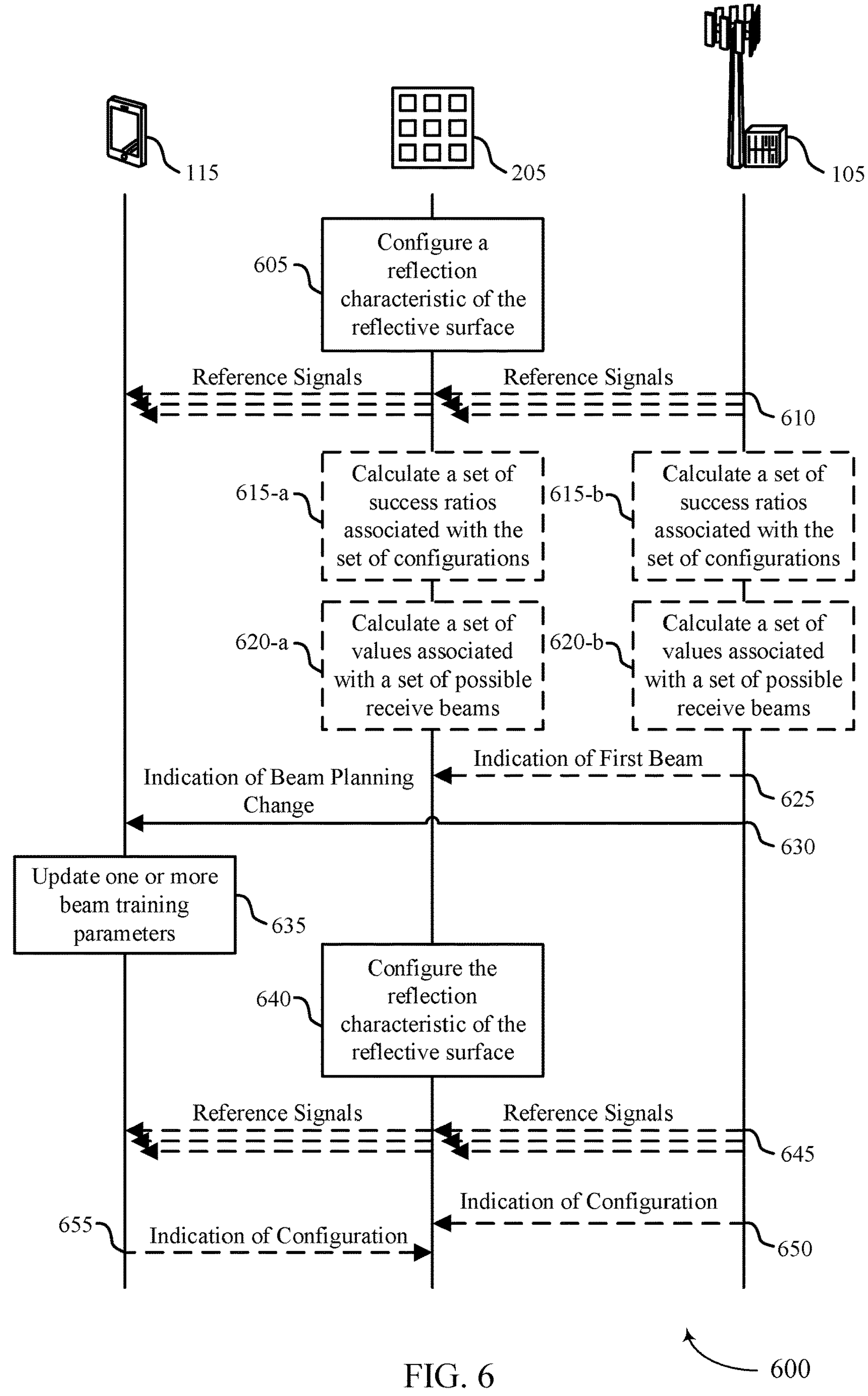
FIG. 6 shows an example of a process flow that supports beam acquisition for an RIS in accordance with aspects of the present disclosure.

FIG. 6 shows an example of a process flow 600 that supports beam acquisition for an RIS in accordance with aspects of the present disclosure. The process flow 600 may implement or be implemented to realize aspects of the wireless communications system 100, the wireless communications system 200, the wireless communications system 201, the beam training procedure 300, the beam pair hypotheses 400, or the beam pair hypotheses 500. For example, the process flow 600 illustrates communication between a base station 105, an RIS 205 (or a device including, coupled with, or otherwise capable of controlling or configuring an RIS 205, which may be understood as a near-passive reflective surface), and a UE 115, and such devices may be examples of corresponding devices described herein, including with reference to FIGS. 1-5. In some implementations, the base station 105, the RIS 205, and the UE 115 may perform or otherwise participate in a two-step beam training procedure to reduce an overall quantity of RIS configurations and beam pair hypotheses that the devices may test to establish a link between the base station 105 and the UE 115 via the RIS 205 (e.g., in the event of a beam failure between the base station 105 and the RIS 205).

In the following description of the process flow 600, the operations may be performed (such as reported or provided) in a different order than the order shown, or the operations performed by the example devices may be performed in different orders or at different times. Some operations also may be omitted from the process flow 600, or other operations may be added to the process flow 600. Further, although some operations or signaling may be shown to occur at different times for discussion purposes, these operations may actually occur at the same time or otherwise concurrently.

At 605, the RIS 205 (or a device controlling the RIS 205, such as an RIS CU 220) may configure, as part of a first beam training procedure (e.g., a first step of a two-step beam training procedure), a reflection characteristic of the RIS 205 in accordance with a set of configurations associated with the RIS 205. In some aspects, the set of configurations associated with the RIS 205 may correspond to a subset of beam pair hypotheses of a set of possible beam pair hypotheses, where each beam pair hypothesis of the set of possible beam pair hypotheses is associated with a unique pair of a receive beam for directional communication from the base station 105 and a reflected beam for directional communication to the UE 115.

At 610, the base station 105 may transmit, to the RIS 205, a first set of one or more reference signals as part of the first beam training procedure between the RIS 205 and the base station 105. In some aspects, base station 105 may transmit the first set of one or more reference signals toward the RIS 205 via different transmit beams while the RIS 205 cycles between the set of configurations associated with the RIS 205. In some aspects, the UE 115 may perform one or more first signal strength measurements in accordance with the first beam training procedure. For example, the UE 115 may search or measure for a reference signal transmission from the base station 105 as part of the first beam training procedure. In some examples, however the base station 105 and the RIS 205 may use the first beam training procedure to select or otherwise find a receive beam of the RIS 205 toward the base station 105 and may refrain from using the one or more first signal strength measurements made by the UE 115 to select the receive beam of the RIS 205 (e.g., as the base station 105 and the RIS 205 may assume a uniform distribution of UEs 115 in a FoV of the RIS 205 during the first beam training procedure).

At 615-*a*, the RIS 205 may, in some implementations, calculate a set of success ratios associated with the set of configurations based on the first beam training procedure. Additionally or alternatively, at 615-*b*, the base station 105 may calculate the set of success ratios associated with the set of configurations based on the first beam training procedure. For example, the RIS 205 or the base station 105, or both, may calculate a respective success ratio for each configuration of the set of configurations based on the RIS 205 configuring its reflection characteristic in accordance with the set of configurations during the first beam training procedure. In some aspects, the RIS 205 or the base station 105 may calculate the set of success ratios statistically assuming a uniform distribution of UEs 115 in a FoV of the RIS 205 (e.g., and not based on a measurement report from the UE 115).

At 620-*a*, the RIS 205 may, in some implementations, calculate a set of values associated with a set of possible receive beams for directional communication from the base station 105 based on the set of success ratios. Additionally or alternatively, at 620-*b*, the base station 105 may calculate the set of values associated with the set of possible receive beams of the RIS 205 for directional communication from the base station 105 based on the set of success ratios. In some aspects, the RIS 205 or the base station 105, or both, may calculate a respective value for each receive beam of the set of possible receive beams. Such a value for each receive beam may be understood as a success ratio or a likelihood for that receive beam to be a correct or otherwise suitable receive beam for the RIS 205 to use to receive communications from the base station 105.

At 625, the base station 105 may transmit, to the RIS 205, an indication of a first beam of the RIS 205 for directional communication between the RIS 205 and the base station 105 based on the set of success ratios associated with the set of configurations and the set of values associated with the set of possible receive beams. For example, the first beam may be associated with a greatest value relative to a remainder of the set of values associated with the set of possible receive beams and the base station 105 may transmit an indication of the first beam to the RIS 205 accordingly. In some aspects, the base station 105 may transmit the indication of the first receive beam to the RIS 205 in examples in which the base station 105 calculates the set of success ratios and the set of values. Similarly, in some aspects, the base station 105 may refrain from transmitting the indication of the first beam to the RIS 205 in examples in which the RIS 205 (or a device capable of controlling or configuring the RIS 205) calculates the set of success ratios and the set of values.

In some implementations, the RIS 205 or the base station 105, or both, may be unable to make a decision relating to which beam the UE 115 may use as a receive beam toward the base station 105 and, in such implementations, the RIS 205, the base station 105, and the UE 115 may perform or otherwise participate in a second iteration of the first beam training procedure based on a partial reduction of the set of configurations (e.g., a partial hypothesis set reduction). Additional details relating to such a partial reduction of the set of configurations of the RIS 205 are described in more detail herein, including with reference to FIG. 4.

At 630, the base station 105 may transmit, to the UE 115, an indication of a beam planning change. For example, the base station 105 may transmit, to the UE 115, an indication of a change from the first beam training procedure to a second beam training procedure (e.g., a second step of the two-step beam training procedure) based on transmitting the indication of the first beam to the RIS 205. In some aspects, the second beam training procedure may be associated with a subset of configurations of the set of configurations that is associated with the first beam. For example, each configuration of the subset of configurations may be associated with a common use of the first beam as a receive beam of the RIS 205 and different reflected beams of the RIS 205.

At 635, the UE 115 may update one or more beam training parameters based on receiving the indication of the change to the second beam training procedure. For example, the UE 115 may discard the one or more first signal strength measurements made during the first beam training procedure or may switch from using a first set of QCL relationships associated with the first set of reference signal beams used by the base station 105 during the first beam training procedure to using a second set of QCL relationships associated with a second set of reference signal beams to be used by the base station 105 during the second beam training procedure.

At 640, the RIS 205 may configure, as part of the second beam training procedure, the reflection characteristic of the RIS 205 in accordance with the subset of configurations based on receiving the indication of the first beam from the base station 105 (or based on self-selecting the first beam, if the RIS 205 calculates the set of success ratios and the set of values).

At 645, the base station 105 may transmit, to the UE 115 via the RIS 205, a second set of one or more reference signals as part of the second beam training procedure between the base station 105 and the UE 115 via the RIS 205. In some implementations, the base station 105 may transmit the second set of one or more reference signals via one or more different transmit beams while the RIS 205 cycles between the subset of configurations. The UE 115 may perform one or more second signal strength measurements in accordance with the second beam training procedure. For example, the UE 115 may search or measure for a reference signal transmission from the base station 105 as part of the second beam training procedure. In some implementations, the UE 115 may transmit, to the base station 105, a measurement report indicating the one or more second signal strength measurements associated with the second beam training procedure.

In some implementations, the base station 105 may detect, measure, or otherwise observe that one or more signal strength measurements fail to satisfy a threshold signal strength or that a network efficiency fails to satisfy a threshold network efficiency, or both. In such implementations, the base station 105 may transmit, to one or both of the RIS 205 or the UE 115, an indication for the RIS 205 to revert to a previous configuration.

At 650, the base station 105 may transmit, to the RIS 205, an indication of a configuration of the RIS 205 for reflecting communications between the base station 105 and the UE 115 based on the measurement report received from the UE 115. For example, in implementations in which the UE 115 transmits a measurement report to the base station 105 indicating the one or more second signal strength measurements from the second beam training procedure, the base station 105 may use the information conveyed by the measurement report, in conjunction with a known order of the cycling between the subset of configurations at the RIS 205 during the second beam training procedure, to determine which configuration of the RIS 205 provides a greatest or otherwise suitable signal strength to the UE 115.

At 655, the UE 115 may transmit, to the RIS 205, an indication of the configuration of the RIS for reflecting communications between the base station 105 and the UE 115. For example, the UE 115 may determine which configuration of the RIS 205 provides a greatest or otherwise suitable signal strength to the UE 115 based on the one or more second signal strength measurements and a known order of the cycling between the subset of configurations at the RIS 205 during the second beam training procedure (which the base station 105 may signal to the UE 115 or which may be pre-configured at the UE 115). In implementations in which the UE 115 transmits an indication of the configuration to the RIS 205, the UE 115 may transmit the indication in addition or as an alternative to transmitting a measurement report to the base station 105 indicating the one or more second signal strength measurements from the second beam training procedure.

As such, the RIS 205 may configure, for a reflecting of communications between the base station 105 and the UE 115, the reflection characteristic of the RIS 205 in accordance with the signaled configuration. The base station 105 and the UE 115 may communicate with each other via the RIS 205 accordingly. In some examples, the RIS 205 may use a same configuration for reflecting communications from the base station 105 to the UE 115 as the RIS 205 uses for reflecting communications from the UE 115 to the base station 105. In some other examples, the RIS 205 may use different configurations for reflecting communications from the base station 105 to the UE 115 as the RIS 205 uses for reflecting communications from the UE 115 to the base station 105 (e.g., and the RIS 205 may, in some examples, be pre-configured with or receive signaling indicating such different configurations). Further, although described herein in the context of reflecting communications between a base station 105 and a UE 115, other communicating devices may similarly implement the techniques described herein. For example, two UEs 115 and an RIS 205 may similarly perform such a two-step beam training procedure for reflecting communications between the two UEs 115. Likewise, two base stations 105 and an RIS may similarly perform such a two-step beam training procedure for reflecting communications between the two base stations 105.

Figure 7:
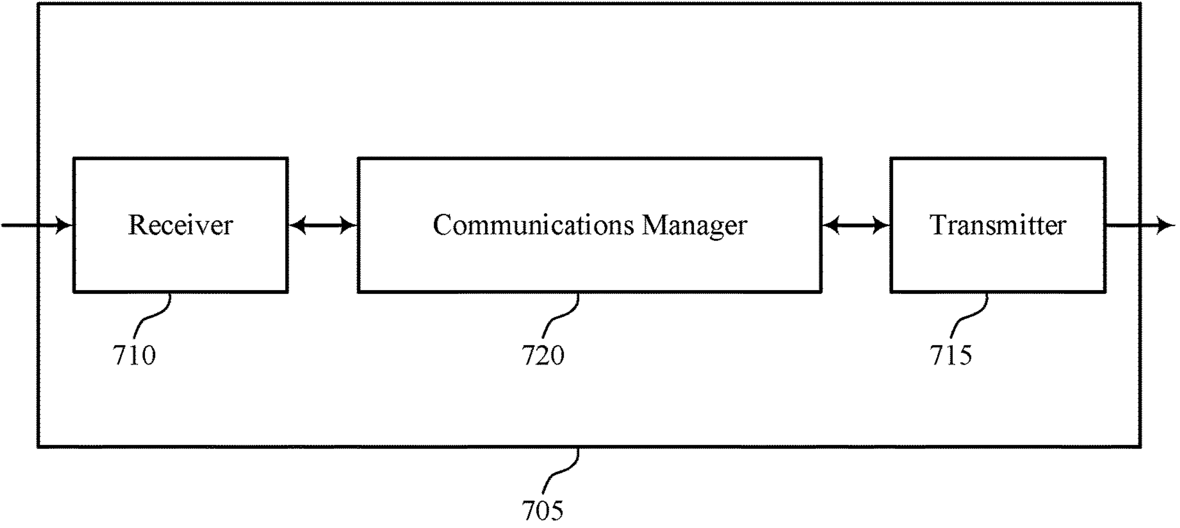
FIGS. 7 and 8 show block diagrams of devices that support beam acquisition for an RIS in accordance with aspects of the present disclosure.

FIG. 7 shows a block diagram 700 of a device 705 that supports beam acquisition for an RIS in accordance with aspects of the present disclosure. The device 705 may be an example of aspects of a UE 115 or a device including, coupled with, or otherwise capable of configuring or controlling an RIS 205 as described herein. The device 705 may include a receiver 710, a transmitter 715, and a communications manager 720. The device 705 may also include a processor (not shown). Each of these components may be in communication with one another (e.g., via one or more buses).

The receiver 710 may provide a means for receiving information such as packets, user data, control information, or any combination thereof associated with various information channels (e.g., control channels, data channels, information channels related to beam acquisition for a reconfigurable intelligent surface). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam acquisition for a reconfigurable intelligent surface). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of beam acquisition for a reconfigurable intelligent surface as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a device including a reflective surface in accordance with examples as disclosed herein. For example, the communications manager 720 may be configured as or otherwise support a means for configuring, as part of a first beam training procedure between the reflective surface and a base station, a reflection characteristic of the reflective surface in accordance with a set of configurations associated with the reflective surface. The communications manager 720 may be configured as or otherwise support a means for receiving an indication of a first beam for directional communication from the base station based on a set of success ratios associated with the set of configurations. The communications manager 720 may be configured as or otherwise support a means for receiving an indication of a configuration of the reflective surface for reflecting communications between the base station and a UE based on the first beam for the directional communication from the base station and a second beam training procedure between the base station and the UE via the reflective surface.

Additionally or alternatively, the communications manager 720 may support wireless communication at a UE in accordance with examples as disclosed herein. For example, the communications manager 720 may be configured as or otherwise support a means for receiving, from a base station, an indication of a change to a second beam training procedure between the base station and the UE via a reflective surface, the second beam training procedure associated with a subset of configurations of a set of configurations of the reflective surface. The communications manager 720 may be configured as or otherwise support a means for updating one or more beam training parameters based on receiving the indication of the change to the second beam training procedure. The communications manager 720 may be configured as or otherwise support a means for transmitting, to the base station, a measurement report indicating one or more second signal strength measurements associated with the second beam training procedure.

By including or configuring the communications manager 720 in accordance with examples as described herein, the device 705 (e.g., a processor controlling or otherwise coupled to the receiver 710, the transmitter 715, the communications manager 720, or any combination thereof) may support techniques for reduced processing, reduced power consumption, and more efficient utilization of communication resources.

Figure 8:
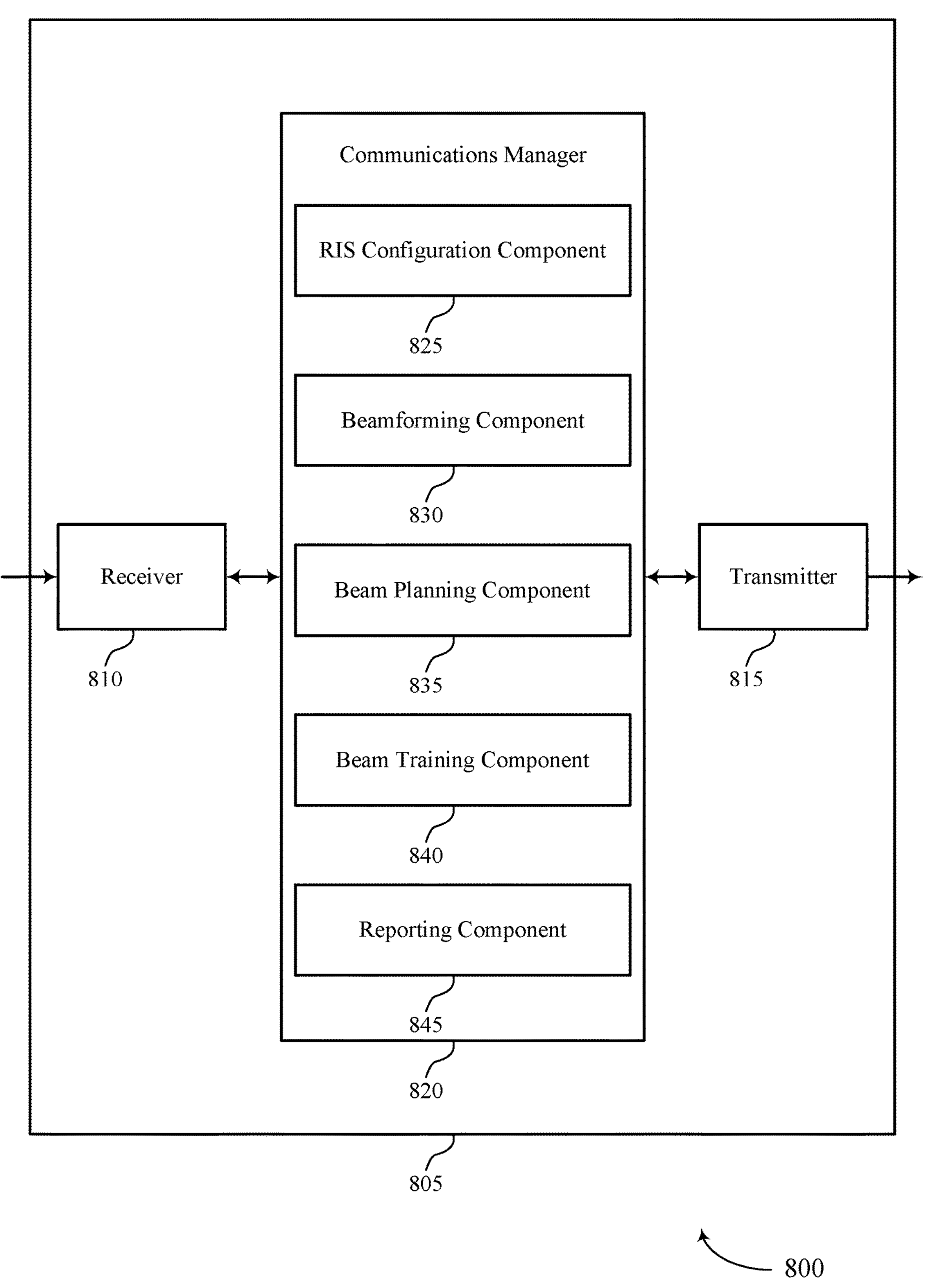

FIG. 8 shows a block diagram 800 of a device 805 that supports beam acquisition for an RIS in accordance with aspects of the present disclosure. The device 805 may be an example of aspects of a device 705 or a UE 115 as described herein. The device 805 may include a receiver 810, a transmitter 815, and a communications manager 820. The device 805 may also include a processor (not shown). Each of these components may be in communication with one another (e.g., via one or more buses).

The receiver 810 may provide a means for receiving information such as packets, user data, control information, or any combination thereof associated with various information channels (e.g., control channels, data channels, information channels related to beam acquisition for a reconfigurable intelligent surface). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to beam acquisition for a reconfigurable intelligent surface). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of beam acquisition for a reconfigurable intelligent surface as described herein. For example, the communications manager 820 may include an RIS configuration component 825, a beamforming component 830, a beam planning component 835, a beam training component 840, a reporting component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a device including a reflective surface in accordance with examples as disclosed herein. The RIS configuration component 825 may be configured as or otherwise support a means for configuring, as part of a first beam training procedure between the reflective surface and a base station, a reflection characteristic of the reflective surface in accordance with a set of configurations associated with the reflective surface. The beamforming component 830 may be configured as or otherwise support a means for receiving an indication of a first beam for directional communication from the base station based on a set of success ratios associated with the set of configurations. The RIS configuration component 825 may be configured as or otherwise support a means for receiving an indication of a configuration of the reflective surface for reflecting communications between the base station and a UE based on the first beam for the directional communication from the base station and a second beam training procedure between the base station and the UE via the reflective surface.

Additionally or alternatively, the communications manager 820 may support wireless communication at a UE in accordance with examples as disclosed herein. The beam planning component 835 may be configured as or otherwise support a means for receiving, from a base station, an indication of a change to a second beam training procedure between the base station and the UE via a reflective surface, the second beam training procedure associated with a subset of configurations of a set of configurations of the reflective surface. The beam training component 840 may be configured as or otherwise support a means for updating one or more beam training parameters based on receiving the indication of the change to the second beam training procedure. The reporting component 845 may be configured as or otherwise support a means for transmitting, to the base station, a measurement report indicating one or more second signal strength measurements associated with the second beam training procedure.

Figure 9:
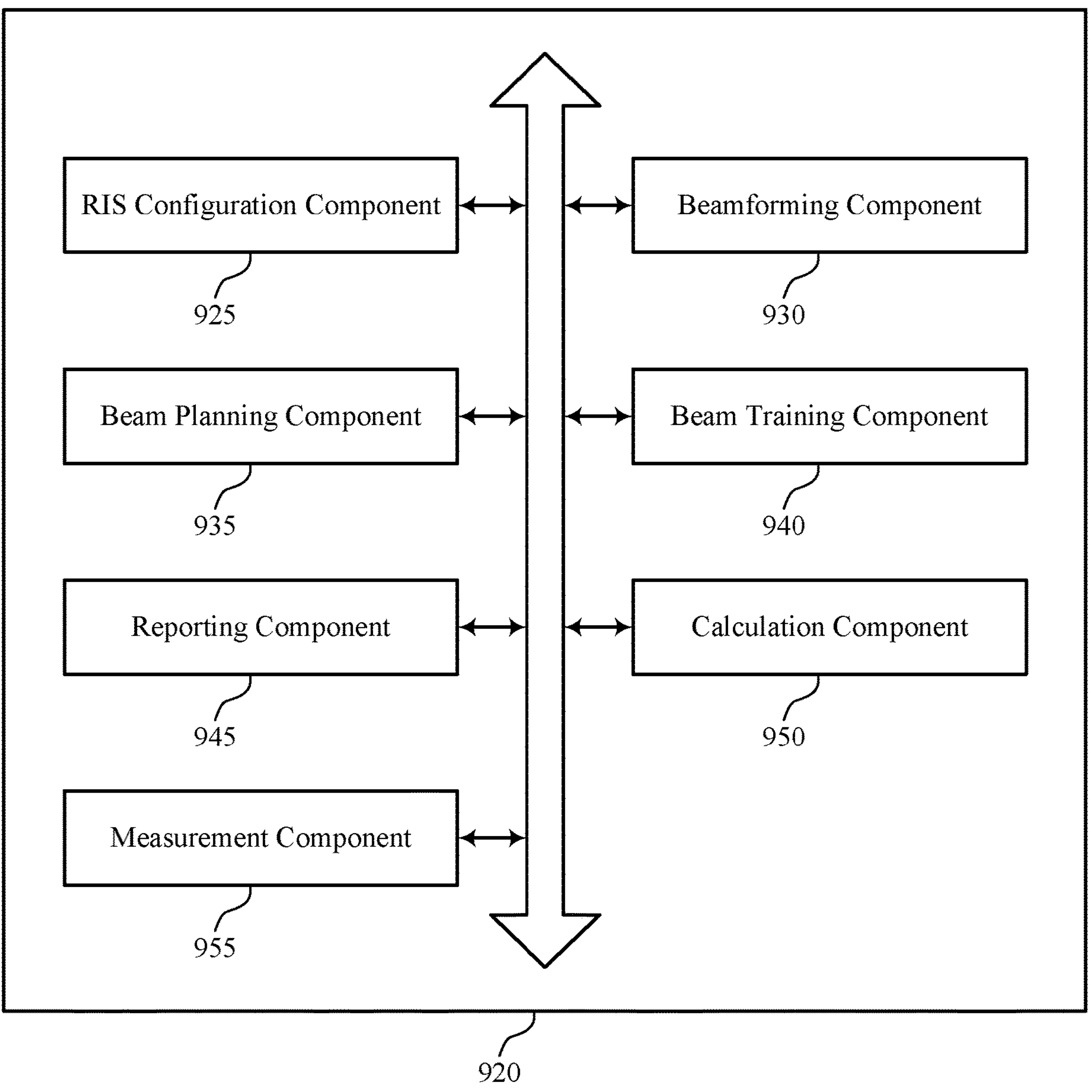
FIG. 9 shows a block diagram of a communications manager that supports beam acquisition for an RIS in accordance with aspects of the present disclosure.

FIG. 9 shows a block diagram 900 of a communications manager 920 that supports beam acquisition for an RIS in accordance with aspects of the present disclosure. The communications manager 920 may be an example of aspects of a communications manager 720, a communications manager 820, or both, as described herein. The communications manager 920, or various components thereof, may be an example of means for performing various aspects of beam acquisition for a reconfigurable intelligent surface as described herein. For example, the communications manager 920 may include an RIS configuration component 925, a beamforming component 930, a beam planning component 935, a beam training component 940, a reporting component 945, a calculation component 950, a measurement component 955, or any combination thereof. Each of these components may communicate, directly or indirectly, with one another (e.g., via one or more buses).

The communications manager 920 may support wireless communication at a device including a reflective surface in accordance with examples as disclosed herein. The RIS configuration component 925 may be configured as or otherwise support a means for configuring, as part of a first beam training procedure between the reflective surface and a base station, a reflection characteristic of the reflective surface in accordance with a set of configurations associated with the reflective surface. The beamforming component 930 may be configured as or otherwise support a means for receiving an indication of a first beam for directional communication from the base station based on a set of success ratios associated with the set of configurations. In some examples, the RIS configuration component 925 may be configured as or otherwise support a means for receiving an indication of a configuration of the reflective surface for reflecting communications between the base station and a UE based on the first beam for the directional communication from the base station and a second beam training procedure between the base station and the UE via the reflective surface.

In some examples, the RIS configuration component 925 may be configured as or otherwise support a means for configuring, as part of the second beam training procedure, the reflection characteristic of the reflective surface in accordance with a subset of configurations of the set of configurations based on receiving the indication of the first beam for the directional communication from the base station, where receiving the indication of the configuration of the reflective surface for reflecting the communications between the base station and the UE is based on configuring the reflection characteristic of the reflective surface in accordance with the subset of configurations.

In some examples, each configuration of the subset of configurations is associated with a common use of the first beam as a receive beam for the directional communication from the base station and different reflected beams for directional communication to the UE.

In some examples, the calculation component 950 may be configured as or otherwise support a means for calculating the set of success ratios associated with the set of configurations based on configuring the reflection characteristic of the reflective surface in accordance with the set of configurations. In some examples, the calculation component 950 may be configured as or otherwise support a means for calculating a set of values associated with a set of possible receive beams for the directional communication from the base station based on the set of success ratios, where each receive beam of the set of possible receive beams is associated with a respective value of the set of values, and where receiving the indication of the first beam is based on the first beam being associated with a greatest value relative to a remainder of the set of values.

In some examples, the set of success ratios are calculated statistically assuming a uniform distribution of UEs in an FoV of the reflective surface.

In some examples, the beam planning component 935 may be configured as or otherwise support a means for receiving, from the base station, an indication of a partial reduction of the set of configurations to a second subset of configurations of the set of configurations based on the set of success ratios associated with the set of configurations. In some examples, the RIS configuration component 925 may be configured as or otherwise support a means for configuring, as part of the first beam training procedure between the reflective surface and the base station, the reflection characteristic of the reflective surface in accordance with the second subset of configurations based on receiving the indication of the partial reduction.

In some examples, the calculation component 950 may be configured as or otherwise support a means for calculating a second set of success ratios associated with the second subset of configurations based on configuring the reflection characteristic of the reflective surface in accordance with the second subset of configurations. In some examples, the calculation component 950 may be configured as or otherwise support a means for calculating a set of values associated with a set of possible receive beams for the directional communication from the base station based on the second set of success ratios, where each receive beam of the set of possible receive beams is associated with a respective value of the set of values, and where receiving the indication of the first beam is based on the first beam being associated with a greatest value relative to a remainder of the set of values.

In some examples, the beam planning component 935 may be configured as or otherwise support a means for receiving, from the base station, an indication of an order associated with the second subset of configurations, where configuring the reflection characteristic of the reflective surface in accordance with the second subset of configurations is based on the order.

In some examples, the RIS configuration component 925 may be configured as or otherwise support a means for receiving, from the base station, an indication to revert to a previous configuration based on one or more signal strength measurements failing to satisfy a threshold signal strength or a network efficiency failing to satisfy a threshold network efficiency, or both.

In some examples, the RIS configuration component 925 may be configured as or otherwise support a means for configuring, for reflecting the communications between the base station and the UE, the reflection characteristic of the reflective surface in accordance with the configuration.

In some examples, the set of configurations of the reflective surface corresponds to a first subset of beam pair hypotheses of a set of possible beam pair hypotheses, each beam pair hypothesis of the set of possible beam pair hypotheses associated with a unique pair of a receive beam for the directional communication from the base station and a reflected beam for directional communication to the UE and each configuration of the set of configurations is associated with a respective success ratio of the set of success ratios.

Additionally or alternatively, the communications manager 920 may support wireless communication at a UE in accordance with examples as disclosed herein. The beam planning component 935 may be configured as or otherwise support a means for receiving, from a base station, an indication of a change to a second beam training procedure between the base station and the UE via a reflective surface, the second beam training procedure associated with a subset of configurations of a set of configurations of the reflective surface. The beam training component 940 may be configured as or otherwise support a means for updating one or more beam training parameters based on receiving the indication of the change to the second beam training procedure. The reporting component 945 may be configured as or otherwise support a means for transmitting, to the base station, a measurement report indicating one or more second signal strength measurements associated with the second beam training procedure.

In some examples, the measurement component 955 may be configured as or otherwise support a means for performing one or more first signal strength measurements in accordance with a first beam training procedure, the first beam training procedure associated with the set of configurations of the reflective surface, where receiving the indication of the change to the second beam training procedure includes. In some examples, the beam planning component 935 may be configured as or otherwise support a means for receiving the indication of the change from the first beam training procedure to the second beam training procedure.

In some examples, to support updating the one or more beam training parameters, the beam training component 940 may be configured as or otherwise support a means for discarding the one or more first signal strength measurements based on receiving the indication of the change to the second beam training procedure.

In some examples, to support updating the one or more beam training parameters, the beam training component 940 may be configured as or otherwise support a means for switching from using a first set of QCL relationships associated with a first set of reference signal beams for the first beam training procedure to using a second set of QCL relationships associated with a second set of reference signal beams for the second beam training procedure.

In some examples, the beam planning component 935 may be configured as or otherwise support a means for receiving, from the base station, an indication of a partial reduction of the set of configurations to a second subset of configurations of the set of configurations of the reflective surface. In some examples, the measurement component 955 may be configured as or otherwise support a means for performing one or more third signal strength measurements based on the second subset of configurations of the reflective surface. In some examples, the reporting component 945 may be configured as or otherwise support a means for transmitting, to the base station, a second measurement report indicating the one or more third signal strength measurements.

In some examples, to support receiving the indication of the partial reduction of the set of configurations to the second subset of configurations, the beam training component 940 may be configured as or otherwise support a means for receiving an indication that a subset of reference signal beams of a first set of reference signal beams associated with the first beam training procedure are obsolete, and where performing the one or more third signal strength measurements is based on receiving the indication that the subset of reference signal beams are obsolete.

Figure 10:
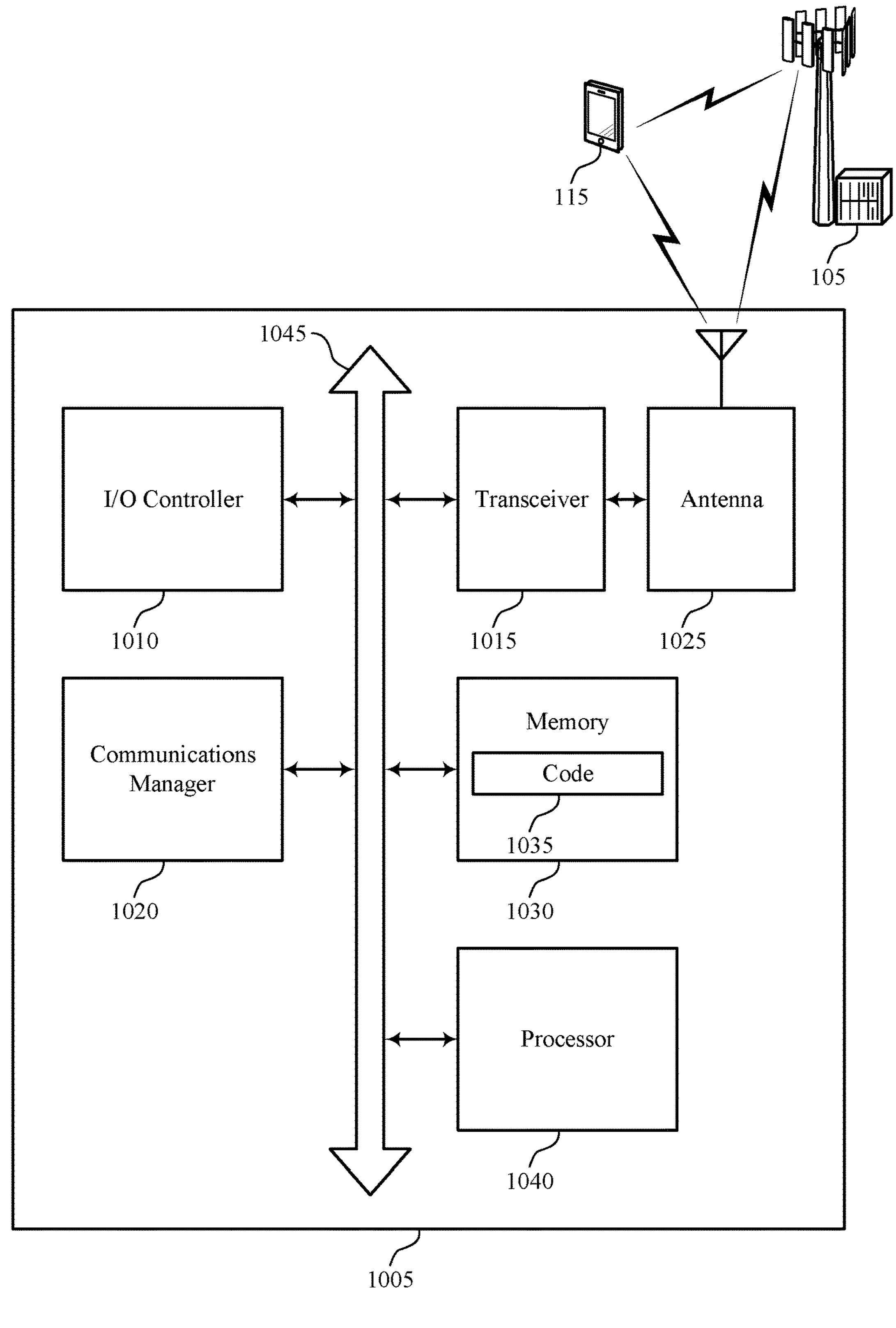
FIG. 10 shows a diagram of a system including a device that supports beam acquisition for an RIS in accordance with aspects of the present disclosure.

FIG. 10 shows a diagram of a system 1000 including a device 1005 that supports beam acquisition for an RIS in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem (not shown) to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam acquisition for a reconfigurable intelligent surface). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a device including a reflective surface in accordance with examples as disclosed herein. For example, the communications manager 1020 may be configured as or otherwise support a means for configuring, as part of a first beam training procedure between the reflective surface and a base station, a reflection characteristic of the reflective surface in accordance with a set of configurations associated with the reflective surface. The communications manager 1020 may be configured as or otherwise support a means for receiving an indication of a first beam for directional communication from the base station based on a set of success ratios associated with the set of configurations. The communications manager 1020 may be configured as or otherwise support a means for receiving an indication of a configuration of the reflective surface for reflecting communications between the base station and a UE based on the first beam for the directional communication from the base station and a second beam training procedure between the base station and the UE via the reflective surface.

Additionally or alternatively, the communications manager 1020 may support wireless communication at a UE in accordance with examples as disclosed herein. For example, the communications manager 1020 may be configured as or otherwise support a means for receiving, from a base station, an indication of a change to a second beam training procedure between the base station and the UE via a reflective surface, the second beam training procedure associated with a subset of configurations of a set of configurations of the reflective surface. The communications manager 1020 may be configured as or otherwise support a means for updating one or more beam training parameters based on receiving the indication of the change to the second beam training procedure. The communications manager 1020 may be configured as or otherwise support a means for transmitting, to the base station, a measurement report indicating one or more second signal strength measurements associated with the second beam training procedure.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described herein with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of beam acquisition for a reconfigurable intelligent surface as described herein, or the processor 1040 and the memory 1030 may be otherwise configured to perform or support such operations.

Figure 11:
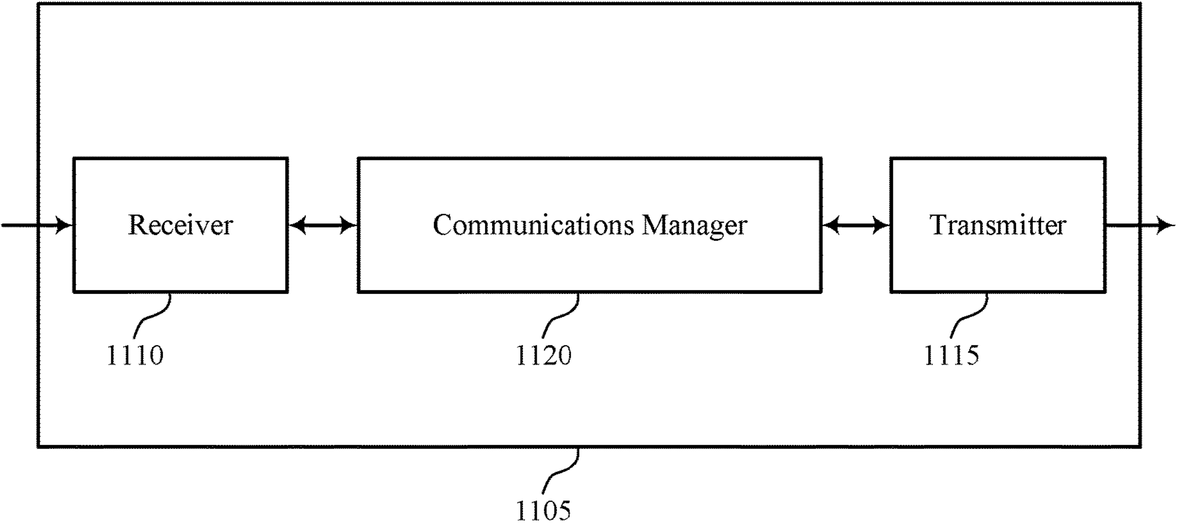
FIGS. 11 and 12 show block diagrams of devices that support beam acquisition for an RIS in accordance with aspects of the present disclosure.

FIG. 11 shows a block diagram 1100 of a device 1105 that supports beam acquisition for an RIS in accordance with aspects of the present disclosure. The device 1105 may be an example of aspects of a base station 105 as described herein. The device 1105 may include a receiver 1110, a transmitter 1115, and a communications manager 1120. The device 1105 may also include a processor (not shown). Each of these components may be in communication with one another (e.g., via one or more buses).

The receiver 1110 may provide a means for receiving information such as packets, user data, control information, or any combination thereof associated with various information channels (e.g., control channels, data channels, information channels related to beam acquisition for a reconfigurable intelligent surface). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to beam acquisition for a reconfigurable intelligent surface). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of beam acquisition for a reconfigurable intelligent surface as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a device including a reflective surface, a first set of reference signals as part of a first beam training procedure between the reflective surface and the base station, the first beam training procedure associated with a set of configurations for a reflective characteristic of the reflective surface. The communications manager 1120 may be configured as or otherwise support a means for transmitting, to the device including the reflective surface, an indication of a first beam for directional communication to the reflective surface based on a set of success ratios associated with the set of configurations. The communications manager 1120 may be configured as or otherwise support a means for transmitting, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam.

By including or configuring the communications manager 1120 in accordance with examples as described herein, the device 1105 (e.g., a processor controlling or otherwise coupled to the receiver 1110, the transmitter 1115, the communications manager 1120, or any combination thereof) may support techniques for reduced processing, reduced power consumption, and more efficient utilization of communication resources.

Figure 12:
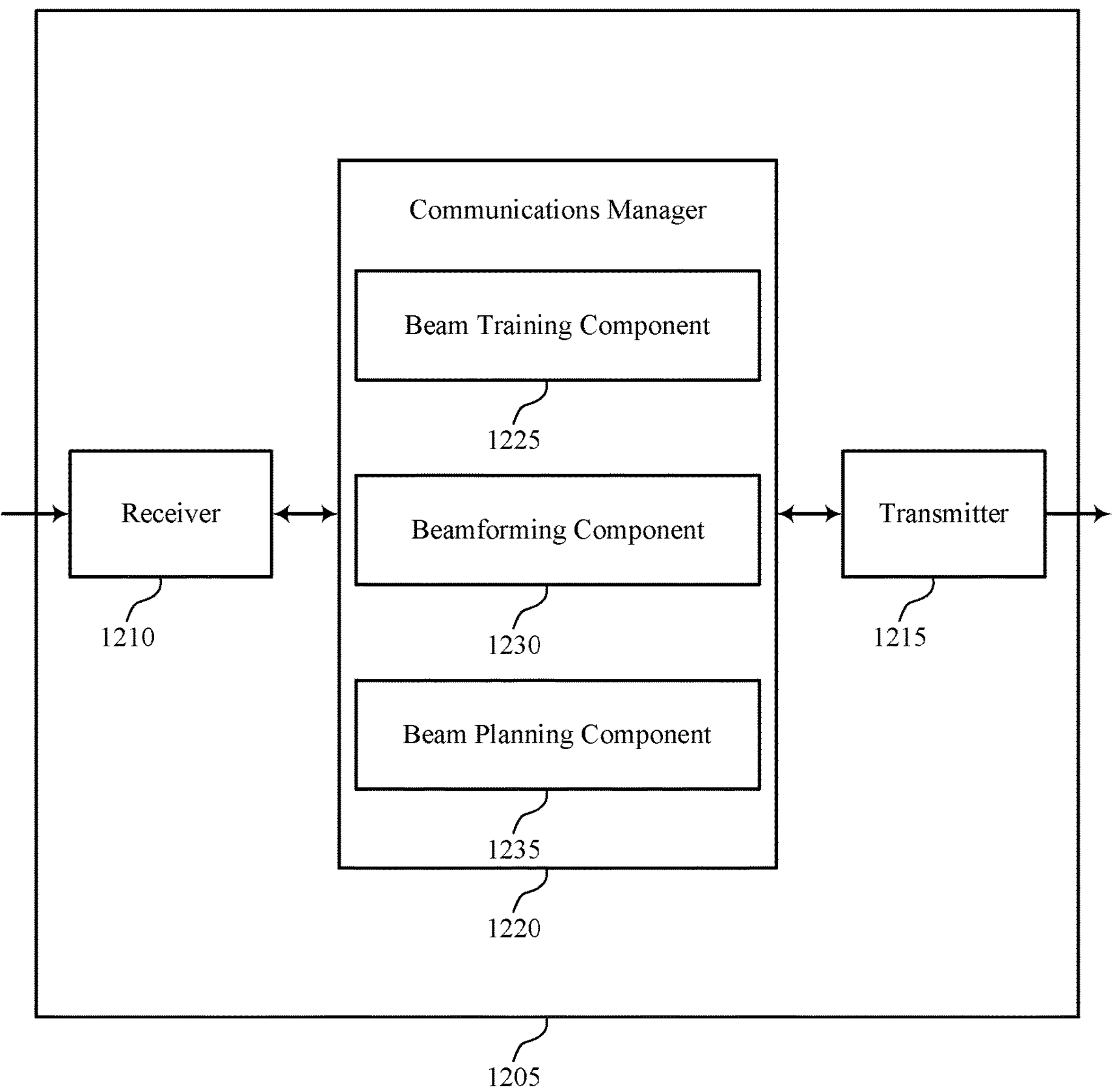

FIG. 12 shows a block diagram 1200 of a device 1205 that supports beam acquisition for an RIS in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor (not shown). Each of these components may be in communication with one another (e.g., via one or more buses).

The receiver 1210 may provide a means for receiving information such as packets, user data, control information, or any combination thereof associated with various information channels (e.g., control channels, data channels, information channels related to beam acquisition for a reconfigurable intelligent surface). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to beam acquisition for a reconfigurable intelligent surface). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of beam acquisition for a reconfigurable intelligent surface as described herein. For example, the communications manager 1220 may include a beam training component 1225, a beamforming component 1230, a beam planning component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The beam training component 1225 may be configured as or otherwise support a means for transmitting, to a device including a reflective surface, a first set of reference signals as part of a first beam training procedure between the reflective surface and the base station, the first beam training procedure associated with a set of configurations for a reflective characteristic of the reflective surface. The beamforming component 1230 may be configured as or otherwise support a means for transmitting, to the device including the reflective surface, an indication of a first beam for directional communication to the reflective surface based on a set of success ratios associated with the set of configurations. The beam planning component 1235 may be configured as or otherwise support a means for transmitting, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam.

Figure 13:
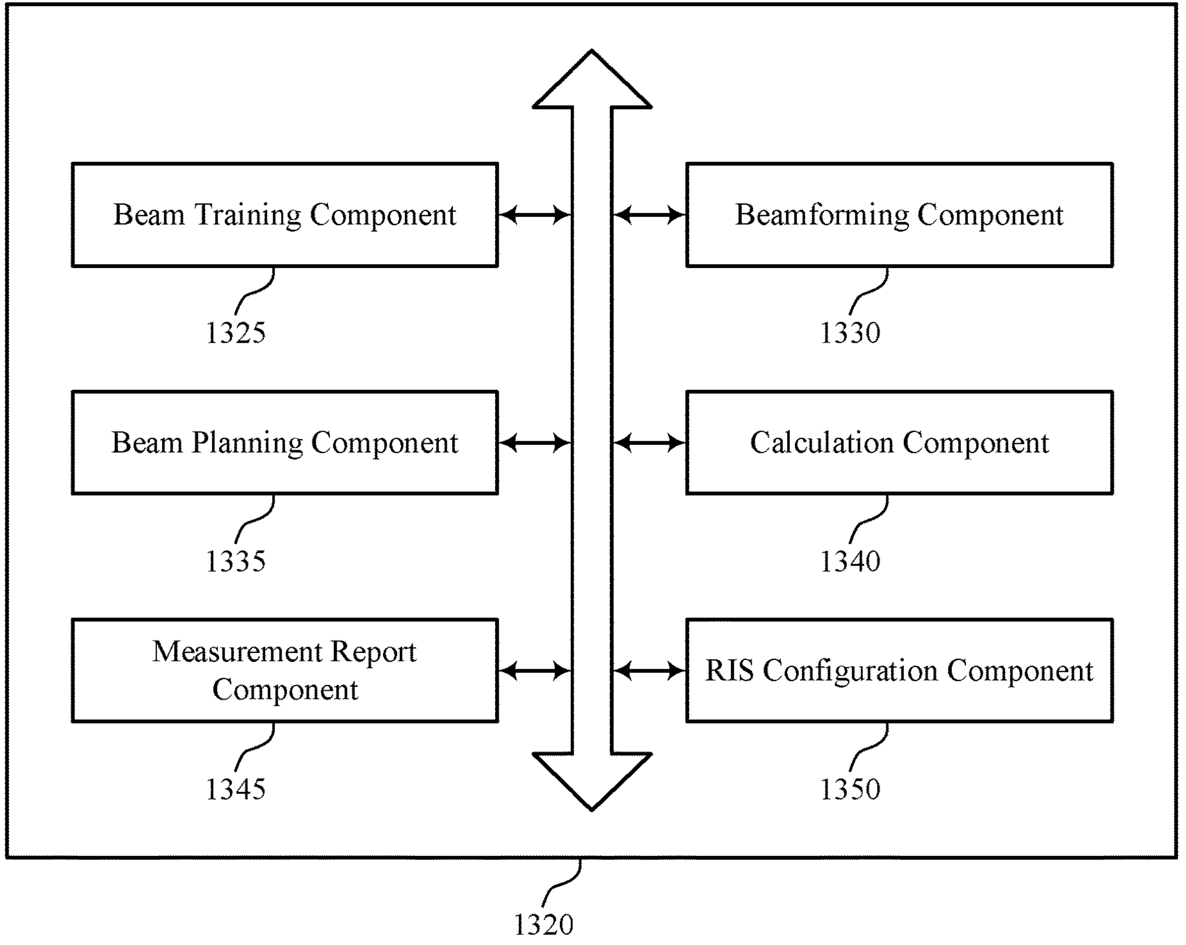
FIG. 13 shows a block diagram of a communications manager that supports beam acquisition for an RIS in accordance with aspects of the present disclosure.

FIG. 13 shows a block diagram 1300 of a communications manager 1320 that supports beam acquisition for an RIS in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of beam acquisition for a reconfigurable intelligent surface as described herein. For example, the communications manager 1320 may include a beam training component 1325, a beamforming component 1330, a beam planning component 1335, a calculation component 1340, a measurement report component 1345, an RIS configuration component 1350, or any combination thereof. Each of these components may communicate, directly or indirectly, with one another (e.g., via one or more buses).

The communications manager 1320 may support wireless communication at a base station in accordance with examples as disclosed herein. The beam training component 1325 may be configured as or otherwise support a means for transmitting, to a device including a reflective surface, a first set of reference signals as part of a first beam training procedure between the reflective surface and the base station, the first beam training procedure associated with a set of configurations for a reflective characteristic of the reflective surface. The beamforming component 1330 may be configured as or otherwise support a means for transmitting, to the device including the reflective surface, an indication of a first beam for directional communication to the reflective surface based on a set of success ratios associated with the set of configurations. The beam planning component 1335 may be configured as or otherwise support a means for transmitting, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam.

In some examples, the calculation component 1340 may be configured as or otherwise support a means for calculating the set of success ratios associated with the set of configurations based on the first beam training procedure associated with the set of configurations. In some examples, the calculation component 1340 may be configured as or otherwise support a means for calculating a set of values associated with a set of possible receive beams for the reflective surface for directional communication with the base station based on the set of success ratios, where each receive beam of the set of possible receive beams is associated with a respective value of the set of values, and where transmitting the indication of the first beam to the device including the reflective surface is based on the first beam being associated with a greatest value relative to a remainder of the set of values.

In some examples, the set of success ratios are calculated statistically assuming a uniform distribution of UEs in an FoV of the reflective surface.

In some examples, the beam planning component 1335 may be configured as or otherwise support a means for transmitting, to the device including the reflective surface and the UE, an indication of a partial reduction of the set of configurations to a second subset of configurations of the set of configurations of the reflective surface based on the set of success ratios associated with the set of configurations. In some examples, the beam training component 1325 may be configured as or otherwise support a means for transmitting, to the device including the reflective surface as part of the first beam training procedure between the reflective surface and the base station, a second set of reference signals based on the indication of the partial reduction.

In some examples, the calculation component 1340 may be configured as or otherwise support a means for calculating a second set of success ratios associated with the second subset of configurations based on transmitting the second set of reference signals. In some examples, the calculation component 1340 may be configured as or otherwise support a means for calculating a set of values associated with a set of possible receive beams for the reflective surface for directional communication with the base station based on the set of success ratios, where each receive beam of the set of possible receive beams is associated with a respective value of the set of values, and where transmitting the indication of the first beam is based on the first beam being associated with a greatest value relative to a remainder of the set of values.

In some examples, the beam planning component 1335 may be configured as or otherwise support a means for transmitting, to the device including the reflective surface, an indication of an order associated with the second subset of configurations, where transmitting the second set of reference signals is based on the order.

In some examples, to support transmitting the indication of the partial reduction of the set of configurations to the second subset of configurations to the UE, the beam training component 1325 may be configured as or otherwise support a means for transmitting an indication that a subset of reference signal beams of a first set of reference signal beams associated with the first beam training procedure are obsolete, and where transmitting the second set of reference signals is based on the indication that the subset of reference signal beams are obsolete.

In some examples, the beam training component 1325 may be configured as or otherwise support a means for transmitting, to the UE via the reflective surface, a second set of reference signals as part of a second beam training procedure between the base station and the UE via the reflective surface. In some examples, the measurement report component 1345 may be configured as or otherwise support a means for receiving, from the UE, a measurement report indicating one or more signal strength measurements associated with the second beam training procedure. In some examples, the RIS configuration component 1350 may be configured as or otherwise support a means for transmitting, to the device including the reflective surface, an indication of a configuration of the reflective surface for reflecting communications between the base station and the UE based on the measurement report.

In some examples, the RIS configuration component 1350 may be configured as or otherwise support a means for transmitting, to the device including the reflective surface, an indication to revert to a previous configuration based on the one or more signal strength measurements failing to satisfy a threshold signal strength or a network efficiency failing to satisfy a threshold network efficiency, or both.

In some examples, each configuration of the subset of configurations is associated with a common use of the first beam as a receive beam of the reflective surface and different reflected beams of the reflective surface.

Figure 14:
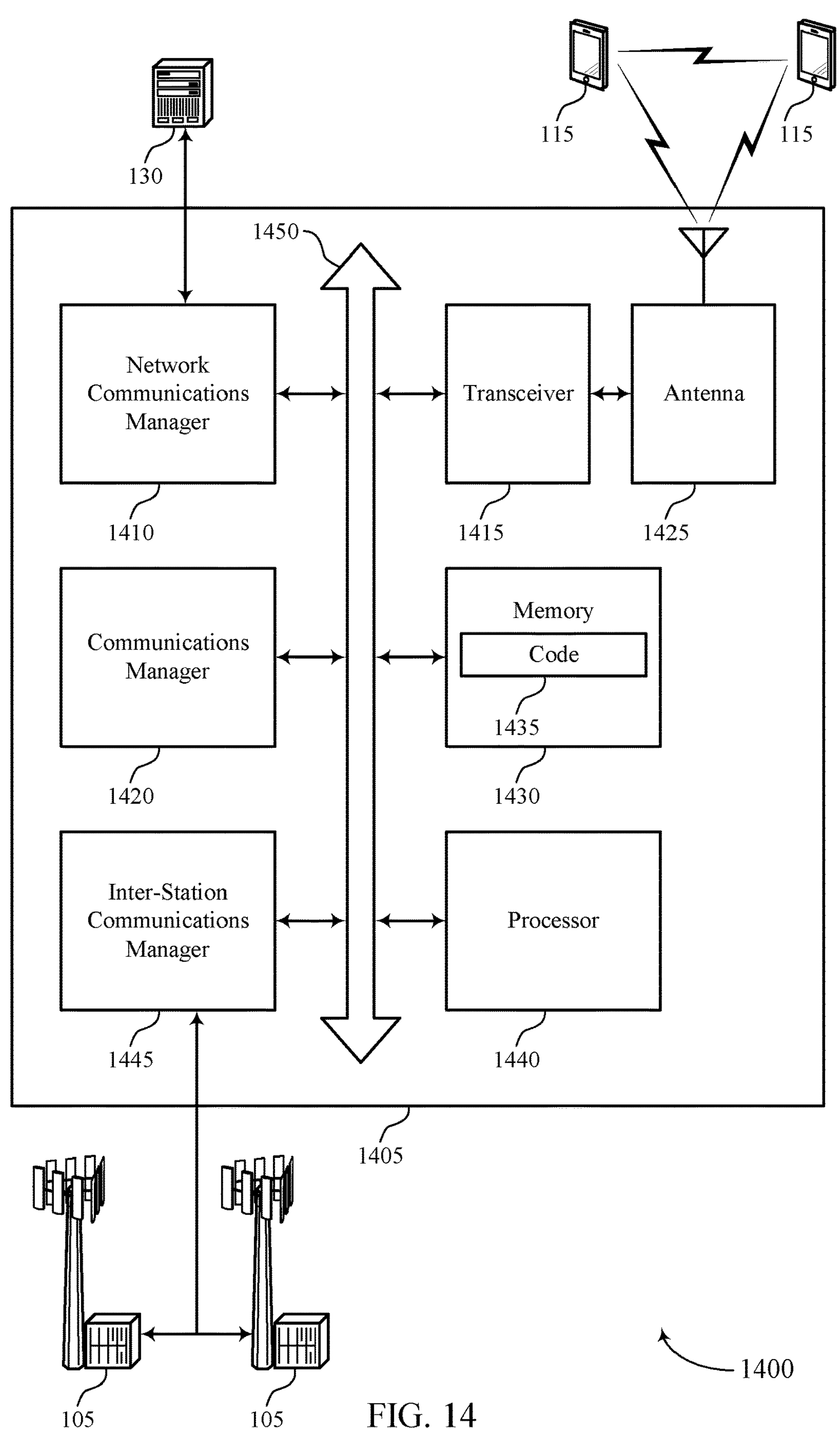
FIG. 14 shows a diagram of a system including a device that supports beam acquisition for an RIS in accordance with aspects of the present disclosure.

FIG. 14 shows a diagram of a system 1400 including a device 1405 that supports beam acquisition for an RIS in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem (not shown) to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting beam acquisition for a reconfigurable intelligent surface). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a device including a reflective surface, a first set of reference signals as part of a first beam training procedure between the reflective surface and the base station, the first beam training procedure associated with a set of configurations for a reflective characteristic of the reflective surface. The communications manager 1420 may be configured as or otherwise support a means for transmitting, to the device including the reflective surface, an indication of a first beam for directional communication to the reflective surface based on a set of success ratios associated with the set of configurations. The communications manager 1420 may be configured as or otherwise support a means for transmitting, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described herein with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of beam acquisition for a reconfigurable intelligent surface as described herein, or the processor 1440 and the memory 1430 may be otherwise configured to perform or support such operations.

Figure 15:
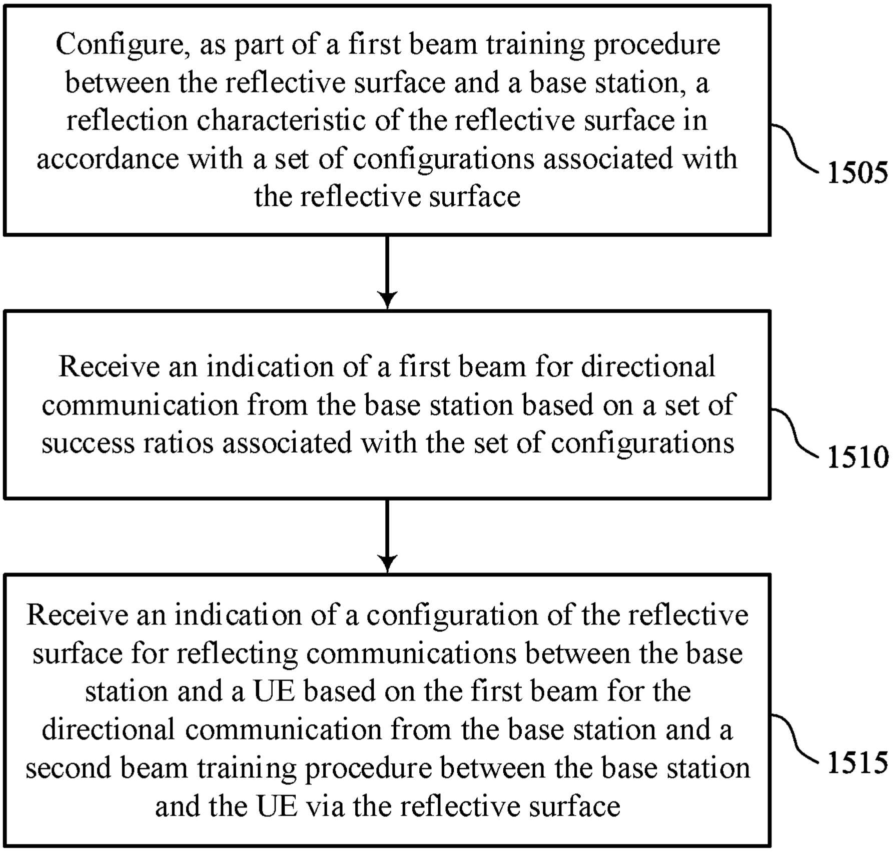

FIG. 15 shows a flowchart illustrating a method 1500 that supports beam acquisition for an RIS in accordance with aspects of the present disclosure. The operations of the method 1500 may be implemented by a UE or its components as described herein. For example, the operations of the method 1500 may be performed by a UE 115 as described herein with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include configuring, as part of a first beam training procedure between the reflective surface and a base station, a reflection characteristic of the reflective surface in accordance with a set of configurations associated with the reflective surface. The operations of 1505 may be performed in accordance with examples as disclosed herein. In some examples, aspects of the operations of 1505 may be performed by an RIS configuration component 925 as described herein with reference to FIG. 9.

At 1510, the method may include receiving an indication of a first beam for directional communication from the base station based on a set of success ratios associated with the set of configurations. The operations of 1510 may be performed in accordance with examples as disclosed herein. In some examples, aspects of the operations of 1510 may be performed by a beamforming component 930 as described herein with reference to FIG. 9.

At 1515, the method may include receiving an indication of a configuration of the reflective surface for reflecting communications between the base station and a UE based on the first beam for the directional communication from the base station and a second beam training procedure between the base station and the UE via the reflective surface. The operations of 1515 may be performed in accordance with examples as disclosed herein. In some examples, aspects of the operations of 1515 may be performed by an RIS configuration component 925 as described herein with reference to FIG. 9.

Figure 16:
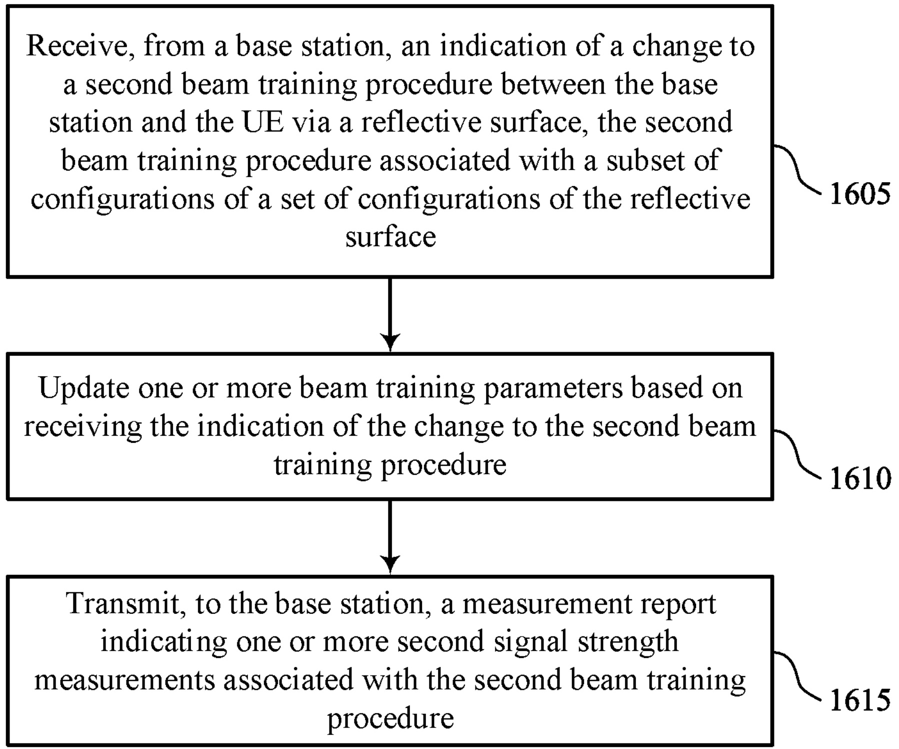

FIG. 16 shows a flowchart illustrating a method 1600 that supports beam acquisition for an RIS in accordance with aspects of the present disclosure. The operations of the method 1600 may be implemented by a UE or its components as described herein. For example, the operations of the method 1600 may be performed by a UE 115 as described herein with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an indication of a change to a second beam training procedure between the base station and the UE via a reflective surface, the second beam training procedure associated with a subset of configurations of a set of configurations of the reflective surface. The operations of 1605 may be performed in accordance with examples as disclosed herein. In some examples, aspects of the operations of 1605 may be performed by a beam planning component 935 as described herein with reference to FIG. 9.

At 1610, the method may include updating one or more beam training parameters based on receiving the indication of the change to the second beam training procedure. The operations of 1610 may be performed in accordance with examples as disclosed herein. In some examples, aspects of the operations of 1610 may be performed by a beam training component 940 as described herein with reference to FIG. 9.

At 1615, the method may include transmitting, to the base station, a measurement report indicating one or more second signal strength measurements associated with the second beam training procedure. The operations of 1615 may be performed in accordance with examples as disclosed herein. In some examples, aspects of the operations of 1615 may be performed by a reporting component 945 as described herein with reference to FIG. 9.

FIG. 17 shows a flowchart illustrating a method 1700 that supports beam acquisition for an RIS in accordance with aspects of the present disclosure. The operations of the method 1700 may be implemented by a base station or its components as described herein. For example, the operations of the method 1700 may be performed by a base station 105 as described herein with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a device including a reflective surface, a first set of reference signals as part of a first beam training procedure between the reflective surface and the base station, the first beam training procedure associated with a set of configurations for a reflective characteristic of the reflective surface. The operations of 1705 may be performed in accordance with examples as disclosed herein. In some examples, aspects of the operations of 1705 may be performed by a beam training component 1325 as described herein with reference to FIG. 13.

At 1710, the method may include transmitting, to the device including the reflective surface, an indication of a first beam for directional communication to the reflective surface based on a set of success ratios associated with the set of configurations. The operations of 1710 may be performed in accordance with examples as disclosed herein. In some examples, aspects of the operations of 1710 may be performed by a beamforming component 1330 as described herein with reference to FIG. 13.

At 1715, the method may include transmitting, to a UE, an indication of a change to a second beam training procedure between the base station and the UE via the reflective surface based on transmitting the indication of the first beam to the reflective surface, the second beam training procedure associated with a subset of configurations of the set of configurations of the reflective surface that is associated with the first beam. The operations of 1715 may be performed in accordance with examples as disclosed herein. In some examples, aspects of the operations of 1715 may be performed by a beam planning component 1335 as described herein with reference to FIG. 13.

The following provides an overview of aspects of the present disclosure:

Aspect 1: A method for wireless communication at a device comprising a reflective surface, comprising: configuring, as part of a first beam training procedure between the reflective surface and a base station, a reflection characteristic of the reflective surface in accordance with a set of configurations associated with the reflective surface: receiving an indication of a first beam for directional communication from the base station based at least in part on a set of success ratios associated with the set of configurations; and receiving an indication of a configuration of the reflective surface for reflecting communications between the base station and a UE based at least in part on the first beam for the directional communication from the base station and a second beam training procedure between the base station and the UE via the reflective surface.

Aspect 2: The method of aspect 1, further comprising: configuring, as part of the second beam training procedure, the reflection characteristic of the reflective surface in accordance with a subset of configurations of the set of configurations based at least in part on receiving the indication of the first beam for the directional communication from the base station, wherein receiving the indication of the configuration of the reflective surface for reflecting the communications between the base station and the UE is based at least in part on configuring the reflection characteristic of the reflective surface in accordance with the subset of configurations.

Aspect 3: The method of aspect 2, wherein each configuration of the subset of configurations is associated with a common use of the first beam as a receive beam for the directional communication from the base station and different reflected beams for directional communication to the UE.

Aspect 4: The method of any of aspects 1 through 3, further comprising: calculating the set of success ratios associated with the set of configurations based at least in part on configuring the reflection characteristic of the reflective surface in accordance with the set of configurations; and calculating a set of values associated with a set of possible receive beams for the directional communication from the base station based at least in part on the set of success ratios, wherein each receive beam of the set of possible receive beams is associated with a respective value of the set of values, and wherein receiving the indication of the first beam is based at least in part on the first beam being associated with a greatest value relative to a remainder of the set of values.

Aspect 5: The method of aspect 4, wherein the set of success ratios are calculated statistically assuming a uniform distribution of UEs in an FoV of the reflective surface.

Aspect 6: The method of any of aspects 1 through 5, further comprising: receiving, from the base station, an indication of a partial reduction of the set of configurations to a second subset of configurations of the set of configurations based at least in part on the set of success ratios associated with the set of configurations; and configuring, as part of the first beam training procedure between the reflective surface and the base station, the reflection characteristic of the reflective surface in accordance with the second subset of configurations based at least in part on receiving the indication of the partial reduction.

Aspect 7: The method of aspect 6, further comprising: calculating a second set of success ratios associated with the second subset of configurations based at least in part on configuring the reflection characteristic of the reflective surface in accordance with the second subset of configurations; and calculating a set of values associated with a set of possible receive beams for the directional communication from the base station based at least in part on the second set of success ratios, wherein each receive beam of the set of possible receive beams is associated with a respective value of the set of values, and wherein receiving the indication of the first beam is based at least in part on the first beam being associated with a greatest value relative to a remainder of the set of values.

Aspect 8: The method of any of aspects 6 or 7, further comprising: receiving, from the base station, an indication of an order associated with the second subset of configurations, wherein configuring the reflection characteristic of the reflective surface in accordance with the second subset of configurations is based at least in part on the order.

Aspect 9: The method of any of aspects 1 through 8, further comprising: receiving, from the base station, an indication to revert to a previous configuration based at least in part on one or more signal strength measurements failing to satisfy a threshold signal strength or a network efficiency failing to satisfy a threshold network efficiency, or both.

Aspect 10: The method of any of aspects 1 through 9, further comprising: configuring, for reflecting the communications between the base station and the UE, the reflection characteristic of the reflective surface in accordance with the configuration.

Aspect 11: The method of any of aspects 1 through 10, wherein the set of configurations of the reflective surface corresponds to a first subset of beam pair hypotheses of a set of possible beam pair hypotheses, each beam pair hypothesis of the set of possible beam pair hypotheses associated with a unique pair of a receive beam for the directional communication from the base station and a reflected beam for directional communication to the UE and each configuration of the set of configurations is associated with a respective success ratio of the set of success ratios.

Aspect 12: A method for wireless communication at a UE, comprising: receiving, from a base station, an indication of a change to a second beam training procedure between the base station and the UE via a reflective surface, the second beam training procedure associated with a subset of configurations of a set of configurations of the reflective surface: updating one or more beam training parameters based at least in part on receiving the indication of the change to the second beam training procedure; and transmitting, to the base station, a measurement report indicating one or more second signal strength measurements associated with the second beam training procedure.

Aspect 13: The method of aspect 12, further comprising: performing one or more first signal strength measurements in accordance with a first beam training procedure, the first beam training procedure associated with the set of configurations of the reflective surface, wherein receiving the indication of the change to the second beam training procedure comprises: receiving the indication of the change from the first beam training procedure to the second beam training procedure.

Aspect 14: The method of aspect 13, wherein updating the one or more beam training parameters comprises: discarding the one or more first signal strength measurements based at least in part on receiving the indication of the change to the second beam training procedure.

Aspect 15: The method of any of aspects 13 or 14, wherein updating the one or more beam training parameters comprises: switching from using a first set of QCL relationships associated with a first set of reference signal beams for the first beam training procedure to using a second set of QCL relationships associated with a second set of reference signal beams for the second beam training procedure.

Aspect 16: The method of any of aspects 13 through 15, further comprising: receiving, from the base station, an indication of a partial reduction of the set of configurations to a second subset of configurations of the set of configurations of the reflective surface: performing one or more third signal strength measurements based at least in part on the second subset of configurations of the reflective surface; and transmitting, to the base station, a second measurement report indicating the one or more third signal strength measurements.

Aspect 17: The method of aspect 16, wherein receiving the indication of the partial reduction of the set of configurations to the second subset of configurations comprises:

receiving an indication that a subset of reference signal beams of a first set of reference signal beams associated with the first beam training procedure are obsolete, and wherein performing the one or more third signal strength measurements is based at least in part on receiving the indication that the subset of reference signal beams are obsolete.

Aspect 18: A method for wireless communication at a base station, comprising: transmitting, to a device comprising a reflective surface, a first set of reference signals as part of a first beam training procedure between the reflective surface and the base station, the first beam training procedure associated with a set of configurations for a reflective characteristic of the reflective surface: transmitting, to the device comprising the reflective surface, an indication of a first beam for directional communication to the reflective surface based at least in part on a set of success ratios associated with the set of configurations; and transmitting, to a UE, an indication of a change to a second beam training procedure between the base station and the UE via the reflective surface based at least in part on transmitting the indication of the first beam to the reflective surface, the second beam training procedure associated with a subset of configurations of the set of configurations of the reflective surface that is associated with the first beam.

Aspect 19: The method of aspect 18, further comprising: calculating the set of success ratios associated with the set of configurations based at least in part on the first beam training procedure associated with the set of configurations; and calculating a set of values associated with a set of possible receive beams for the reflective surface for directional communication with the base station based at least in part on the set of success ratios, wherein each receive beam of the set of possible receive beams is associated with a respective value of the set of values, and wherein transmitting the indication of the first beam to the device comprising the reflective surface is based at least in part on the first beam being associated with a greatest value relative to a remainder of the set of values.

Aspect 20: The method of aspect 19, wherein the set of success ratios are calculated statistically assuming a uniform distribution of UEs in an FoV of the reflective surface.

Aspect 21: The method of any of aspects 18 through 20, further comprising: transmitting, to the device comprising the reflective surface and the UE, an indication of a partial reduction of the set of configurations to a second subset of configurations of the set of configurations of the reflective surface based at least in part on the set of success ratios associated with the set of configurations; and transmitting, to the device comprising the reflective surface as part of the first beam training procedure between the reflective surface and the base station, a second set of reference signals based at least in part on the indication of the partial reduction.

Aspect 22: The method of aspect 21, further comprising: calculating a second set of success ratios associated with the second subset of configurations based at least in part on transmitting the second set of reference signals; and calculating a set of values associated with a set of possible receive beams for the reflective surface for directional communication with the base station based at least in part on the set of success ratios, wherein each receive beam of the set of possible receive beams is associated with a respective value of the set of values, and wherein transmitting the indication of the first beam is based at least in part on the first beam being associated with a greatest value relative to a remainder of the set of values.

Aspect 23: The method of any of aspects 21 or 22, further comprising: transmitting, to the device comprising the reflective surface, an indication of an order associated with the second subset of configurations, wherein transmitting the second set of reference signals is based at least in part on the order.

Aspect 24: The method of any of aspects 21 through 23, wherein transmitting the indication of the partial reduction of the set of configurations to the second subset of configurations to the UE comprises: transmitting an indication that a subset of reference signal beams of a first set of reference signal beams associated with the first beam training procedure are obsolete, and wherein transmitting the second set of reference signals is based at least in part on the indication that the subset of reference signal beams are obsolete.

Aspect 25: The method of any of aspects 18 through 24, further comprising: transmitting, to the UE via the reflective surface, a second set of reference signals as part of a second beam training procedure between the base station and the UE via the reflective surface: receiving, from the UE, a measurement report indicating one or more signal strength measurements associated with the second beam training procedure; and transmitting, to the device comprising the reflective surface, an indication of a configuration of the reflective surface for reflecting communications between the base station and the UE based at least in part on the measurement report Aspect 26: The method of aspect 25, further comprising: transmitting, to the device comprising the reflective surface, an indication to revert to a previous configuration based at least in part on the one or more signal strength measurements failing to satisfy a threshold signal strength or a network efficiency failing to satisfy a threshold network efficiency, or both.

Aspect 27: The method of any of aspects 25 or 26, wherein each configuration of the subset of configurations is associated with a common use of the first beam as a receive beam of the reflective surface and different reflected beams of the reflective surface.

Aspect 28: An apparatus for wireless communication at a device comprising a reflective surface, comprising a processor: memory coupled with the processor; and instructions stored in the memory and executable by the processor to cause the apparatus to perform a method of any of aspects 1 through 11.

Aspect 29: An apparatus for wireless communication at a device comprising a reflective surface, comprising at least one means for performing a method of any of aspects 1 through 11.

Aspect 30: A non-transitory computer-readable medium storing code for wireless communication at a device comprising a reflective surface, the code comprising instructions executable by a processor to perform a method of any of aspects 1 through 11.

Aspect 31: An apparatus for wireless communication at a UE, comprising a processor: memory coupled with the processor; and instructions stored in the memory and executable by the processor to cause the apparatus to perform a method of any of aspects 12 through 17.

Aspect 32: An apparatus for wireless communication at a UE, comprising at least one means for performing a method of any of aspects 12 through 17.

Aspect 33: A non-transitory computer-readable medium storing code for wireless communication at a UE, the code comprising instructions executable by a processor to perform a method of any of aspects 12 through 17.

Aspect 34: An apparatus for wireless communication at a base station, comprising a processor: memory coupled with the processor; and instructions stored in the memory and executable by the processor to cause the apparatus to perform a method of any of aspects 18 through 27.

Aspect 35: An apparatus for wireless communication at a base station, comprising at least one means for performing a method of any of aspects 18 through 27.

Aspect 36: A non-transitory computer-readable medium storing code for wireless communication at a base station, the code comprising instructions executable by a processor to perform a method of any of aspects 18 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a device comprising a reflective surface, comprising:
a processor; and
a memory coupled with the processor, with instructions stored in the memory, the instructions being executable by the processor to cause the apparatus to:
configure, as part of a first beam training procedure between the reflective surface and a base station, a reflection characteristic of the reflective surface in accordance with a set of configurations associated with the reflective surface;
receive an indication of a first beam for directional communication from the base station based at least in part on a set of success ratios associated with the set of configurations; and
receive an indication of a configuration of the reflective surface for reflecting communications between the base station and a user equipment (UE) based at least in part on the first beam for the directional communication from the base station and a second beam training procedure between the base station and the UE via the reflective surface.

2. The apparatus of claim 1, wherein the instructions are further executable by the processor to cause the apparatus to:
configure, as part of the second beam training procedure, the reflection characteristic of the reflective surface in accordance with a subset of configurations of the set of configurations based at least in part on receiving the indication of the first beam for the directional communication from the base station, wherein receiving the indication of the configuration of the reflective surface for reflecting the communications between the base station and the UE is based at least in part on configuring the reflection characteristic of the reflective surface in accordance with the subset of configurations.

3. The apparatus of claim 2, wherein each configuration of the subset of configurations is associated with a common use of the first beam as a receive beam for the directional communication from the base station and different reflected beams for directional communication to the UE.

4. The apparatus of claim 1, wherein the instructions are further executable by the processor to cause the apparatus to:
calculate the set of success ratios associated with the set of configurations based at least in part on configuring the reflection characteristic of the reflective surface in accordance with the set of configurations; and
calculate a set of values associated with a set of possible receive beams for the directional communication from the base station based at least in part on the set of success ratios, wherein each receive beam of the set of possible receive beams is associated with a respective value of the set of values, and wherein receiving the indication of the first beam is based at least in part on the first beam being associated with a greatest value relative to a remainder of the set of values.

5. The apparatus of claim 4, wherein the set of success ratios are calculated statistically assuming a uniform distribution of UEs in a field of view of the reflective surface.

6. The apparatus of claim 1, wherein the instructions are further executable by the processor to cause the apparatus to:
receive, from the base station, an indication of a partial reduction of the set of configurations to a second subset of configurations of the set of configurations based at least in part on the set of success ratios associated with the set of configurations; and
configure, as part of the first beam training procedure between the reflective surface and the base station, the reflection characteristic of the reflective surface in accordance with the second subset of configurations based at least in part on receiving the indication of the partial reduction.

7. The apparatus of claim 6, wherein the instructions are further executable by the processor to cause the apparatus to:
calculate a second set of success ratios associated with the second subset of configurations based at least in part on configuring the reflection characteristic of the reflective surface in accordance with the second subset of configurations; and
calculate a set of values associated with a set of possible receive beams for the directional communication from the base station based at least in part on the second set of success ratios, wherein each receive beam of the set of possible receive beams is associated with a respective value of the set of values, and wherein receiving the indication of the first beam is based at least in part on the first beam being associated with a greatest value relative to a remainder of the set of values.

8. The apparatus of claim 6, wherein the instructions are further executable by the processor to cause the apparatus to:
receive, from the base station, an indication of an order associated with the second subset of configurations, wherein configuring the reflection characteristic of the reflective surface in accordance with the second subset of configurations is based at least in part on the order.

9. The apparatus of claim 1, wherein the instructions are further executable by the processor to cause the apparatus to:
receive, from the base station, an indication to revert to a previous configuration based at least in part on one or more signal strength measurements failing to satisfy a threshold signal strength or a network efficiency failing to satisfy a threshold network efficiency, or both.

10. The apparatus of claim 1, wherein the instructions are further executable by the processor to cause the apparatus to:
configure, for reflecting the communications between the base station and the UE, the reflection characteristic of the reflective surface in accordance with the configuration.

11. The apparatus of claim 1, wherein:
the set of configurations of the reflective surface corresponds to a first subset of beam pair hypotheses of a set of possible beam pair hypotheses, each beam pair hypothesis of the set of possible beam pair hypotheses associated with a unique pair of a receive beam for the directional communication from the base station and a reflected beam for directional communication to the UE; and
each configuration of the set of configurations is associated with a respective success ratio of the set of success ratios.

12. An apparatus for wireless communication at a user equipment (UE), comprising:

a processor; and a memory coupled with the processor, with instructions stored in the memory, the instructions being executable by the processor to cause the apparatus to:

receive, from a base station, an indication of a change to a second beam training procedure between the base station and the UE via a reflective surface, the second beam training procedure associated with a subset of configurations of a set of configurations of the reflective surface;

update one or more beam training parameters based at least in part on receiving the indication of the change to the second beam training procedure; and transmit, to the base station, a measurement report indicating one or more second signal strength measurements associated with the second beam training procedure.

13. The apparatus of claim 12, wherein the instructions are further executable by the processor to cause the apparatus to:

perform one or more first signal strength measurements in accordance with a first beam training procedure, the first beam training procedure associated with the set of configurations of the reflective surface, wherein receiving the indication of the change to the second beam training procedure comprises:

receive the indication of the change from the first beam training procedure to the second beam training procedure.

14. The apparatus of claim 13, wherein the instructions to update the one or more beam training parameters are executable by the processor to cause the apparatus to:

discard the one or more first signal strength measurements based at least in part on receiving the indication of the change to the second beam training procedure.

15. The apparatus of claim 13, wherein the instructions to update the one or more beam training parameters are executable by the processor to cause the apparatus to:

switch from using a first set of quasi-colocation relationships associated with a first set of reference signal beams for the first beam training procedure to using a second set of quasi-colocation relationships associated with a second set of reference signal beams for the second beam training procedure.

16. The apparatus of claim 13, wherein the instructions are further executable by the processor to cause the apparatus to:

receive, from the base station, an indication of a partial reduction of the set of configurations to a second subset of configurations of the set of configurations of the reflective surface;

perform one or more third signal strength measurements based at least in part on the second subset of configurations of the reflective surface; and transmit, to the base station, a second measurement report indicating the one or more third signal strength measurements.

17. The apparatus of claim 16, wherein the instructions to receive the indication of the partial reduction of the set of configurations to the second subset of configurations are executable by the processor to cause the apparatus to:

receive an indication that a subset of reference signal beams of a first set of reference signal beams associated with the first beam training procedure are obsolete, and wherein performing the one or more third signal strength measurements is based at least in part on receiving the indication that the subset of reference signal beams are obsolete.

18. An apparatus for wireless communication at a base station, comprising:

a processor; and a memory coupled with the processor, with instructions stored in the memory, the instructions being executable by the processor to cause the apparatus to:

transmit, to a device comprising a reflective surface, a first set of reference signals as part of a first beam training procedure between the reflective surface and the base station, the first beam training procedure associated with a set of configurations for a reflective characteristic of the reflective surface;

transmit, to the device comprising the reflective surface, an indication of a first beam for directional communication to the reflective surface based at least in part on a set of success ratios associated with the set of configurations; and transmit, to a user equipment (UE), an indication of a change to a second beam training procedure between the base station and the UE via the reflective surface based at least in part on transmitting the indication of the first beam to the reflective surface, the second beam training procedure associated with a subset of configurations of the set of configurations of the reflective surface that is associated with the first beam.

19. The apparatus of claim 18, wherein the instructions are further executable by the processor to cause the apparatus to:

calculate the set of success ratios associated with the set of configurations based at least in part on the first beam training procedure associated with the set of configurations; and calculate a set of values associated with a set of possible receive beams for the reflective surface for directional communication with the base station based at least in part on the set of success ratios, wherein each receive beam of the set of possible receive beams is associated with a respective value of the set of values, and wherein transmitting the indication of the first beam to the device comprising the reflective surface is based at least in part on the first beam being associated with a greatest value relative to a remainder of the set of values.

20. The apparatus of claim 19, wherein the set of success ratios are calculated statistically assuming a uniform distribution of UEs in a field of view of the reflective surface.

21. The apparatus of claim 18, wherein the instructions are further executable by the processor to cause the apparatus to:

transmit, to the device comprising the reflective surface and the UE, an indication of a partial reduction of the set of configurations to a second subset of configurations of the set of configurations of the reflective surface based at least in part on the set of success ratios associated with the set of configurations; and transmit, to the device comprising the reflective surface as part of the first beam training procedure between the reflective surface and the base station, a second set of reference signals based at least in part on the indication of the partial reduction.

22. The apparatus of claim 21, wherein the instructions are further executable by the processor to cause the apparatus to:

calculate a second set of success ratios associated with the second subset of configurations based at least in part on transmitting the second set of reference signals; and calculate a set of values associated with a set of possible receive beams for the reflective surface for directional communication with the base station based at least in part on the set of success ratios, wherein each receive beam of the set of possible receive beams is associated with a respective value of the set of values, and wherein transmitting the indication of the first beam is based at least in part on the first beam being associated with a greatest value relative to a remainder of the set of values.

23. The apparatus of claim 21, wherein the instructions are further executable by the processor to cause the apparatus to:

transmit, to the device comprising the reflective surface, an indication of an order associated with the second subset of configurations, wherein transmitting the second set of reference signals is based at least in part on the order.

24. The apparatus of claim 21, wherein the instructions to transmit the indication of the partial reduction of the set of configurations to the second subset of configurations to the UE are executable by the processor to cause the apparatus to:

transmit an indication that a subset of reference signal beams of a first set of reference signal beams associated with the first beam training procedure are obsolete, and wherein transmitting the second set of reference signals is based at least in part on the indication that the subset of reference signal beams are obsolete.

25. The apparatus of claim 18, wherein the instructions are further executable by the processor to cause the apparatus to:

transmit, to the UE via the reflective surface, a second set of reference signals as part of the second beam training procedure between the base station and the UE via the reflective surface;

receive, from the UE, a measurement report indicating one or more signal strength measurements associated with the second beam training procedure; and transmit, to the device comprising the reflective surface, an indication of a configuration of the reflective surface for reflecting communications between the base station and the UE based at least in part on the measurement report.

26. The apparatus of claim 25, wherein the instructions are further executable by the processor to cause the apparatus to:

transmit, to the device comprising the reflective surface, an indication to revert to a previous configuration based at least in part on the one or more signal strength measurements failing to satisfy a threshold signal strength or a network efficiency failing to satisfy a threshold network efficiency, or both.

27. The apparatus of claim 25, wherein each configuration of the subset of configurations is associated with a common use of the first beam as a receive beam of the reflective surface and different reflected beams of the reflective surface.

28. A method for wireless communication at a device comprising a reflective surface, comprising:

configuring, as part of a first beam training procedure between the reflective surface and a base station, a reflection characteristic of the reflective surface in accordance with a set of configurations associated with the reflective surface;

receiving an indication of a first beam for directional communication from the base station based at least in part on a set of success ratios associated with the set of configurations; and receiving an indication of a configuration of the reflective surface for reflecting communications between the base station and a user equipment (UE) based at least in part on the first beam for the directional communication from the base station and a second beam training procedure between the base station and the UE via the reflective surface.

29. The method of claim 28, further comprising:

configuring, as part of the second beam training procedure, the reflection characteristic of the reflective surface in accordance with a subset of configurations of the set of configurations based at least in part on receiving the indication of the first beam for the directional communication from the base station, wherein receiving the indication of the configuration of the reflective surface for reflecting the communications between the base station and the UE is based at least in part on configuring the reflection characteristic of the reflective surface in accordance with the subset of configurations.

30. The method of claim 29, wherein each configuration of the subset of configurations is associated with a common use of the first beam as a receive beam for the directional communication from the base station and different reflected beams for directional communication to the UE.

* * * * *